US007887910B2

(12) United States Patent
Kuramoto et al.

(10) Patent No.: US 7,887,910 B2
(45) Date of Patent: Feb. 15, 2011

(54) LAMINATED OPTICAL ELEMENT

(75) Inventors: Keiichi Kuramoto, Kadoma (JP); Nobuhiko Hayashi, Osaka (JP); Hitoshi Hirano, Nishinomiya (JP); Mitsuaki Matsumoto, Hirakata (JP); Masaya Nakai, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 958 days.

(21) Appl. No.: 11/665,182

(22) PCT Filed: May 11, 2006

(86) PCT No.: PCT/JP2006/009454

§ 371 (c)(1),
(2), (4) Date: Apr. 12, 2007

(87) PCT Pub. No.: WO2006/121102

PCT Pub. Date: Nov. 16, 2006

(65) Prior Publication Data

US 2009/0046379 A1      Feb. 19, 2009

(30) Foreign Application Priority Data

May 13, 2005   (JP)   ............................... 2005-140504
Aug. 31, 2005  (JP)   ............................... 2005-252753

(51) Int. Cl.
*B32B 5/16*   (2006.01)
(52) U.S. Cl. .................................................... 428/323
(58) Field of Classification Search ................... 428/323
See application file for complete search history.

(56) References Cited

U.S. PATENT DOCUMENTS

| 4,235,654 | A | | 11/1980 | Dohi et al. |
| 5,050,979 | A | * | 9/1991 | Shinohara .................... 351/159 |
| 5,462,806 | A | * | 10/1995 | Konishi et al. ............... 428/451 |
| 5,695,851 | A | * | 12/1997 | Watanabe et al. ........... 428/147 |
| 2003/0165710 | A1 | | 9/2003 | Kuramoto et al. |
| 2005/0141240 | A1 | | 6/2005 | Hata et al. |

FOREIGN PATENT DOCUMENTS

| JP | 52-025651 | 2/1977 |
| JP | 54-6006 | 1/1979 |
| JP | 05-100104 | 4/1993 |
| JP | 06-222201 | 8/1994 |
| JP | 2003-277509 | 10/2003 |
| JP | 2005-070325 | 3/2005 |
| JP | 2005-109059 | 4/2005 |

* cited by examiner

*Primary Examiner*—Callie E Shosho
*Assistant Examiner*—Elizabeth Robinson
(74) *Attorney, Agent, or Firm*—NDQ&M Watchstone LLP

(57) ABSTRACT

A laminated optical element includes an optical substrate made of an optical material, an intermediate layer provided on the optical substrate, and an optical resin layer provided on the intermediate layer. The optical resin layer is made of a resin composed of an organometallic polymer having an -M-O-M- bond (M is a metal atom), a metal alkoxide and/or a hydrolysate thereof having only one hydrolyzable group, and an organic polymer having a urethane bond and a methacryloxy group or an acryloxy group. The intermediate layer is obtained by dispersing metal oxide microparticles in a matrix resin composed of a metal alkoxide having a radical polymerizable group and a hydrolyzable group and/or a hydrolysate thereof.

19 Claims, 20 Drawing Sheets

[FIG. 1]
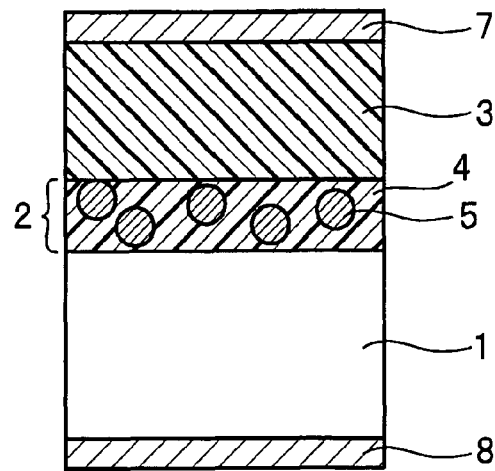
[FIG. 2]
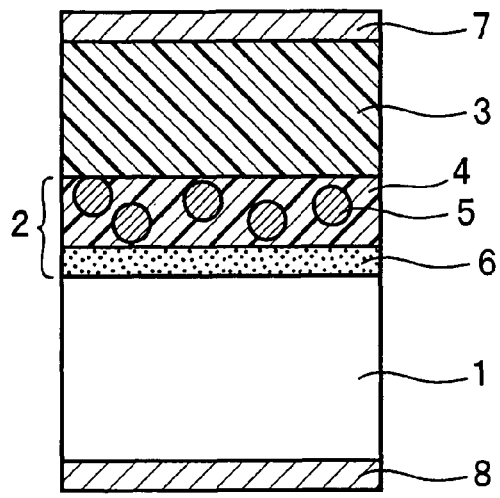
[FIG. 3]
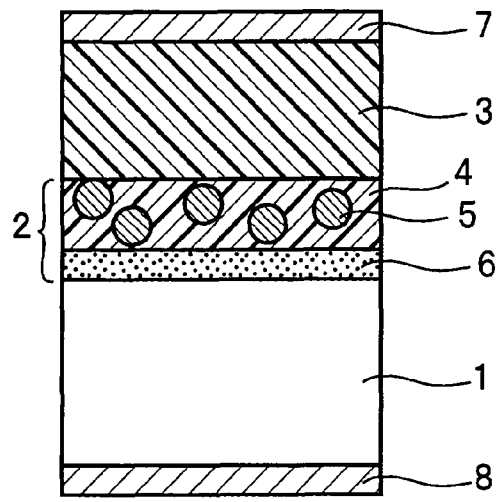

[FIG. 4]
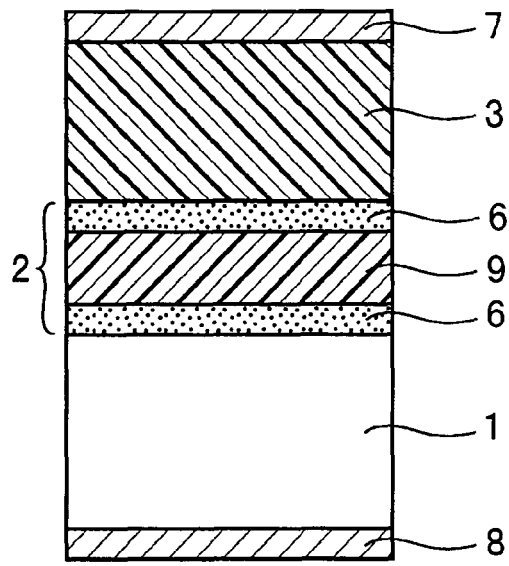
[FIG. 5]
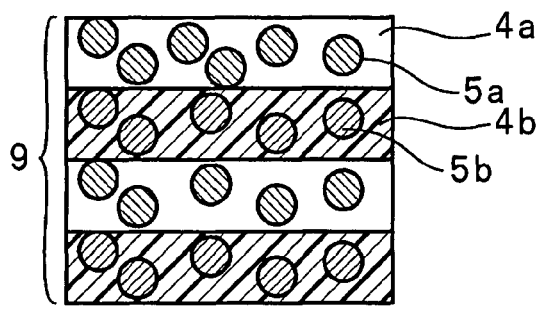
[FIG. 6]
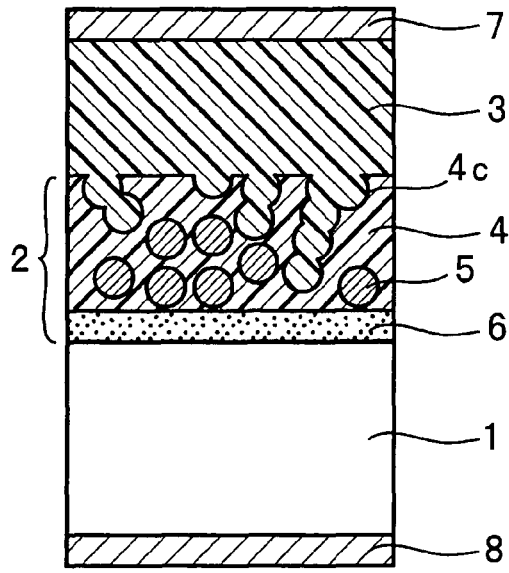

[FIG. 7]
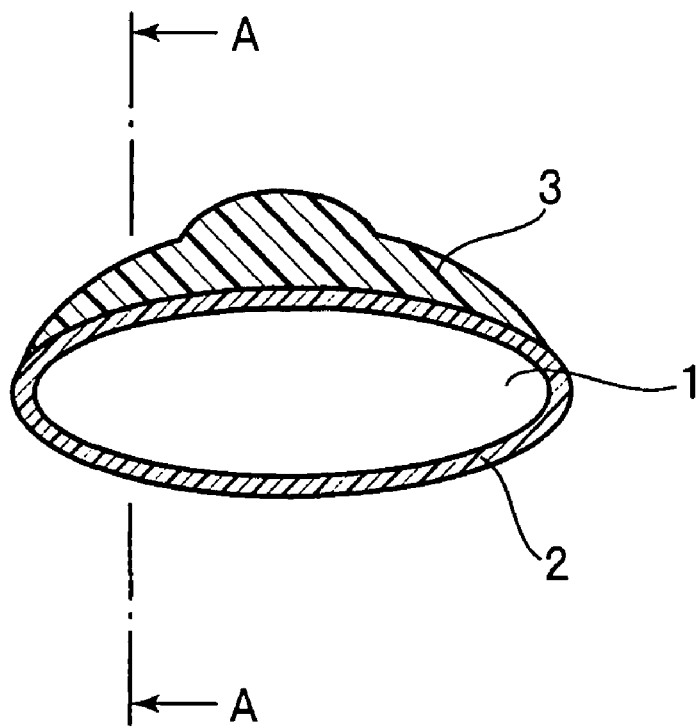
[FIG. 8]
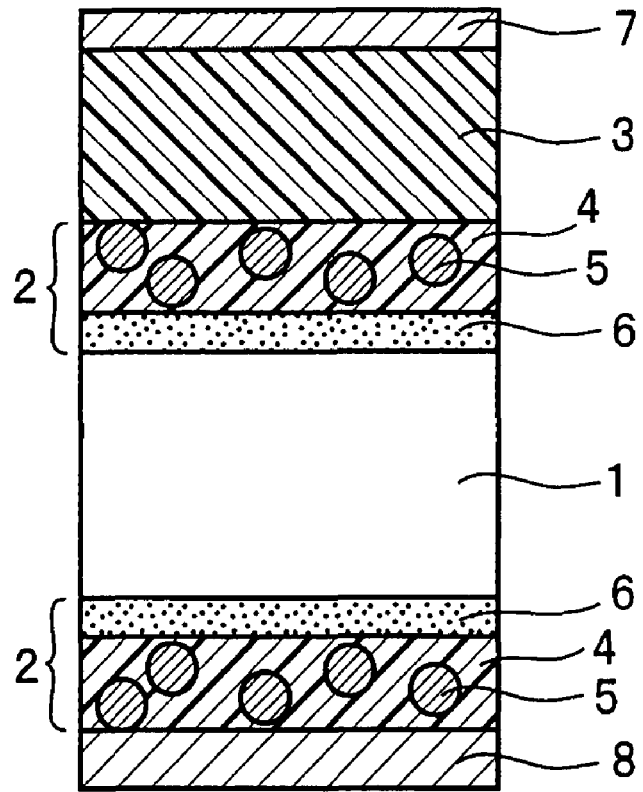

[FIG. 9]
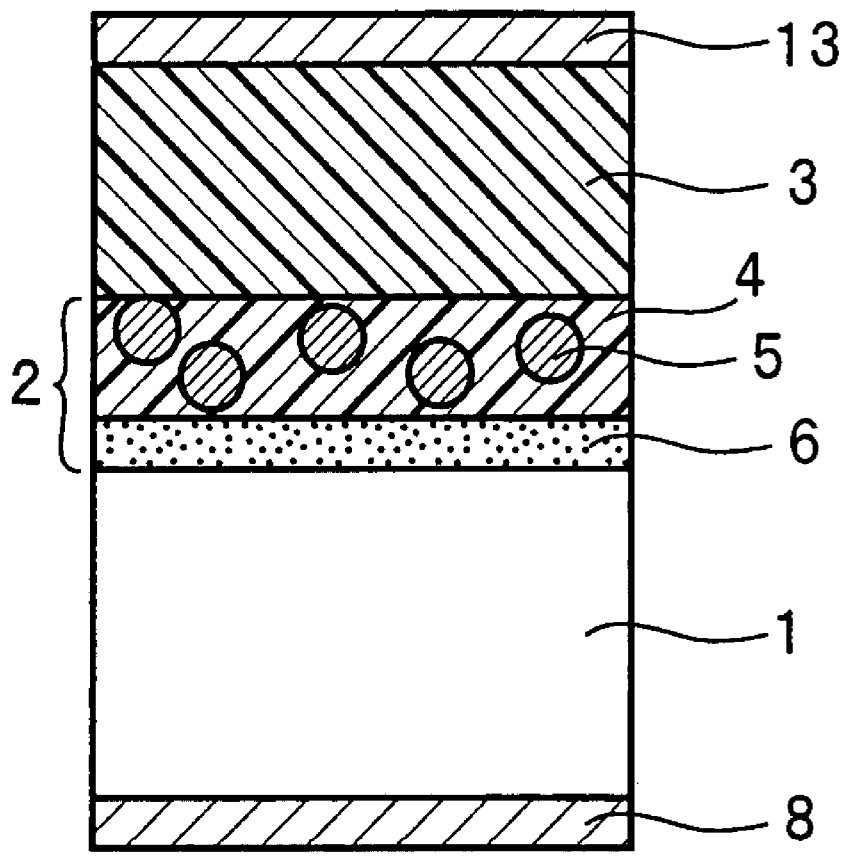
[FIG. 10]
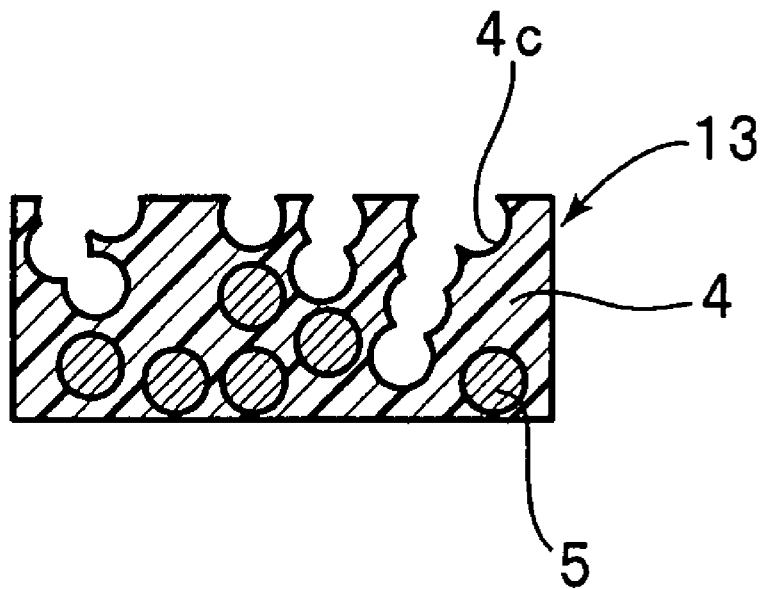

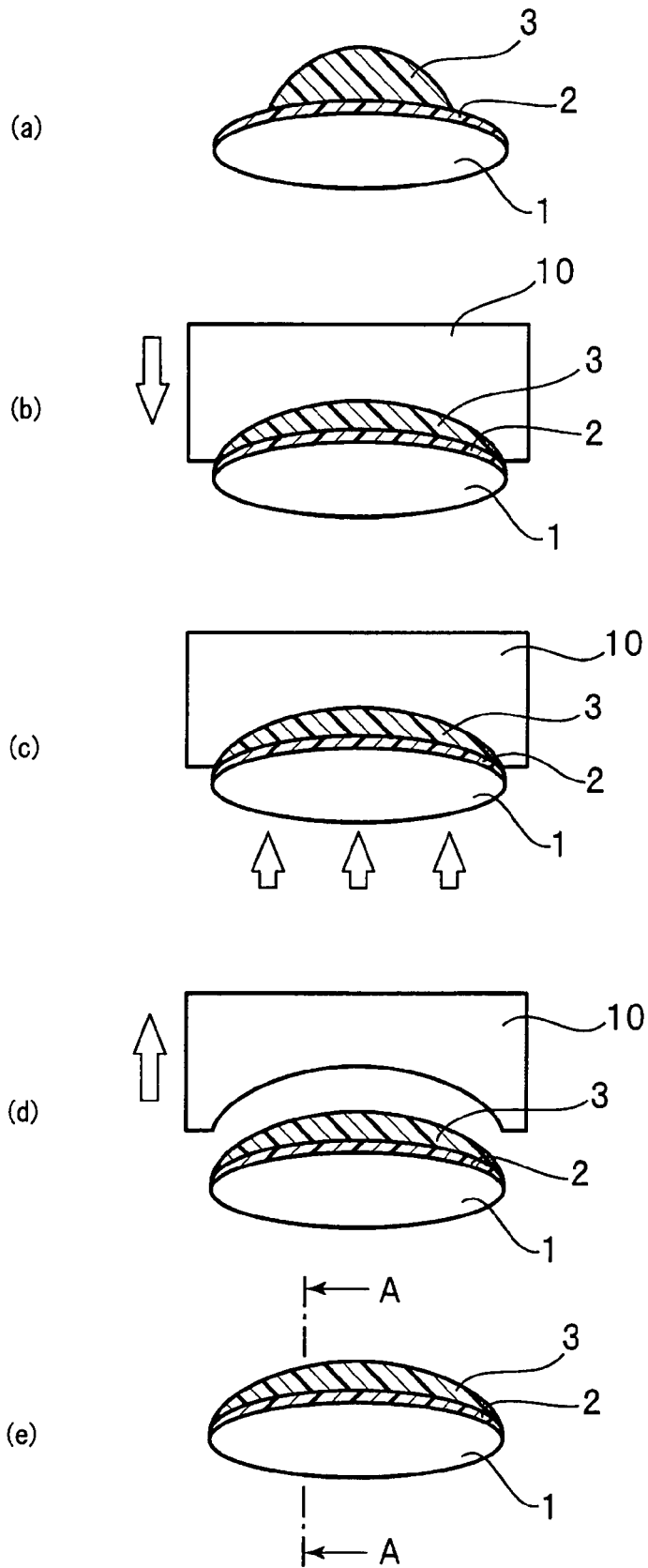
[FIG. 11]

[FIG. 12]
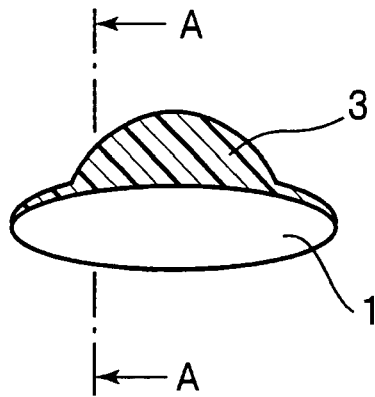
[FIG. 13]
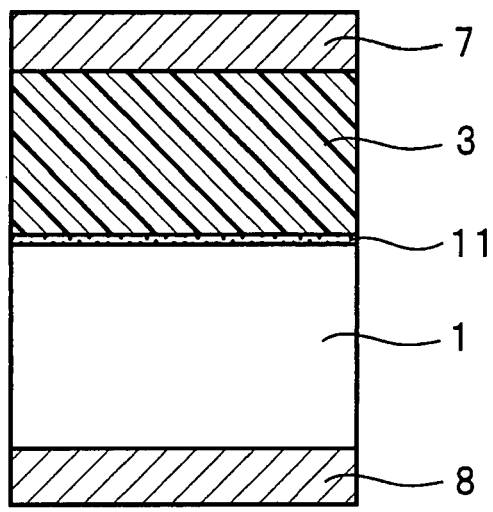
[FIG. 14]
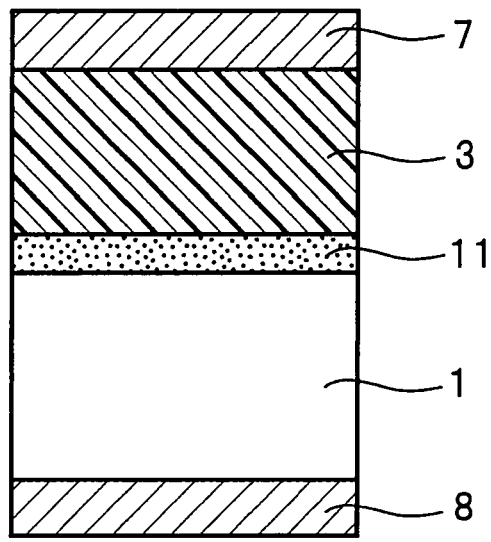

[FIG. 15]
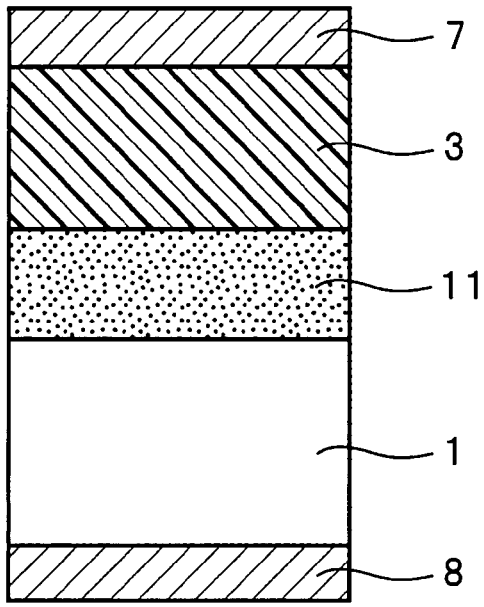
[FIG. 16]
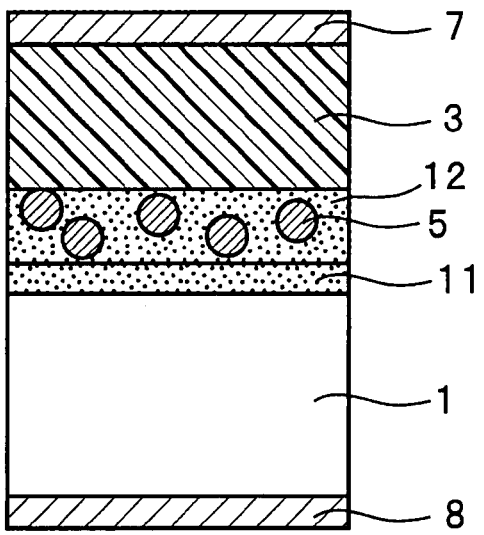
[FIG. 17]
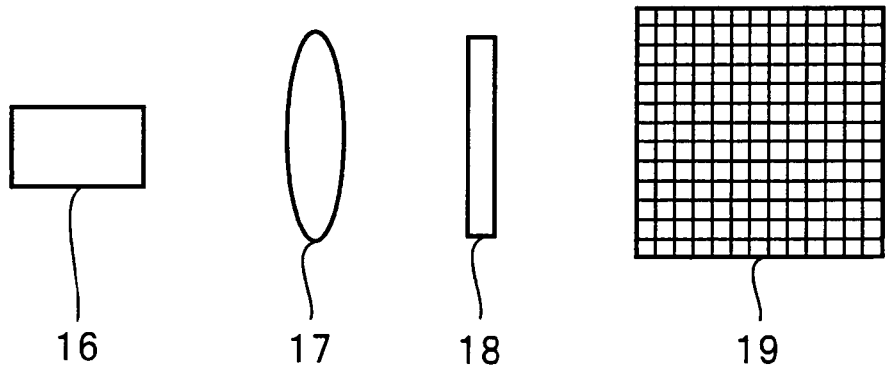

[FIG. 18]
(a)
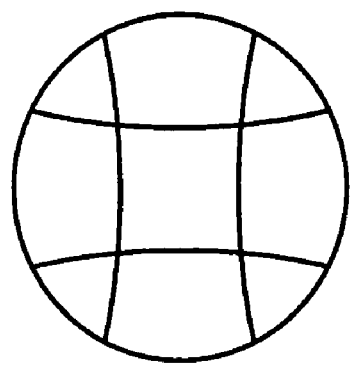
(b)
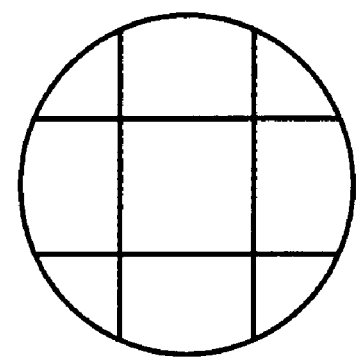
[FIG. 19]
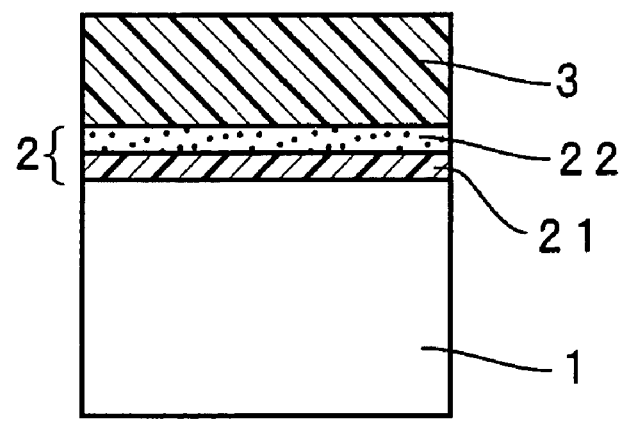

[FIG. 20]
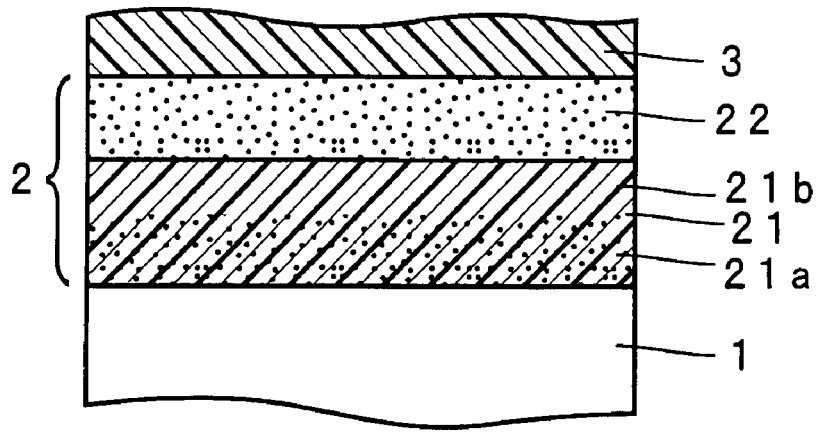
[FIG. 21]
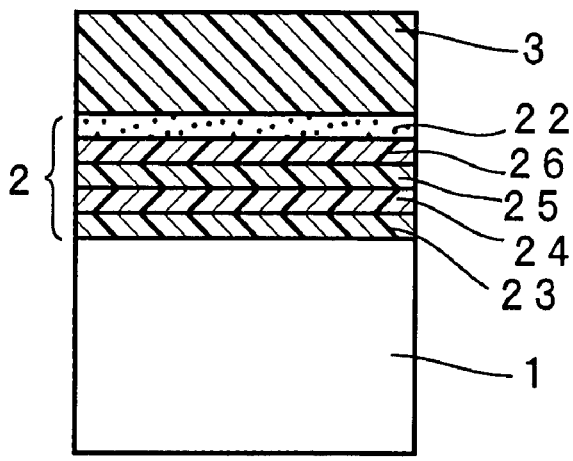
[FIG. 22]
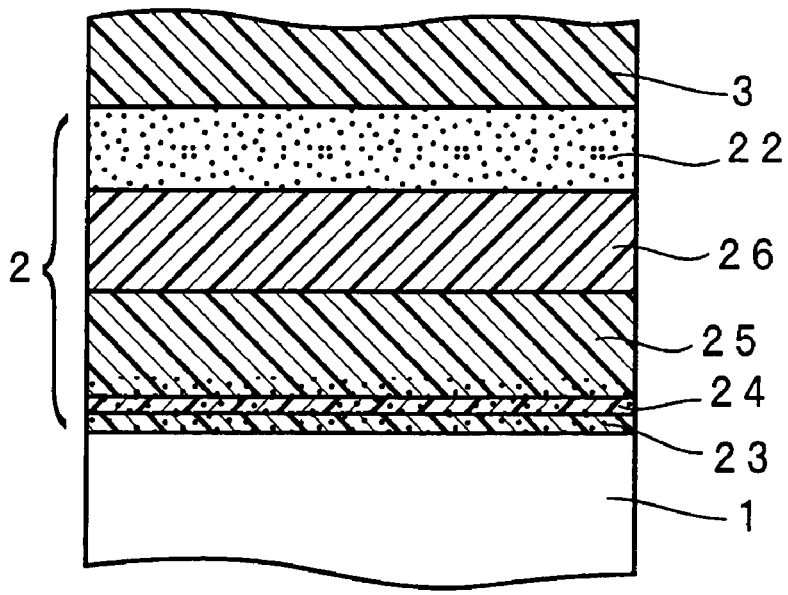

[FIG. 23]
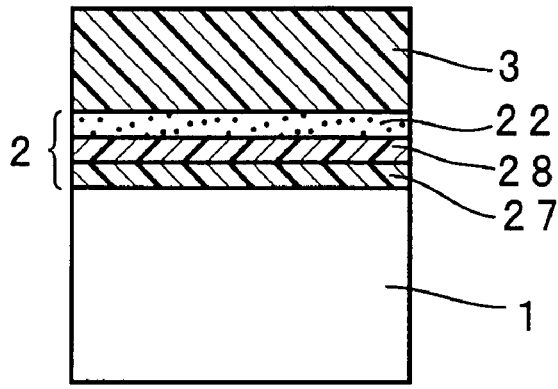
[FIG. 24]
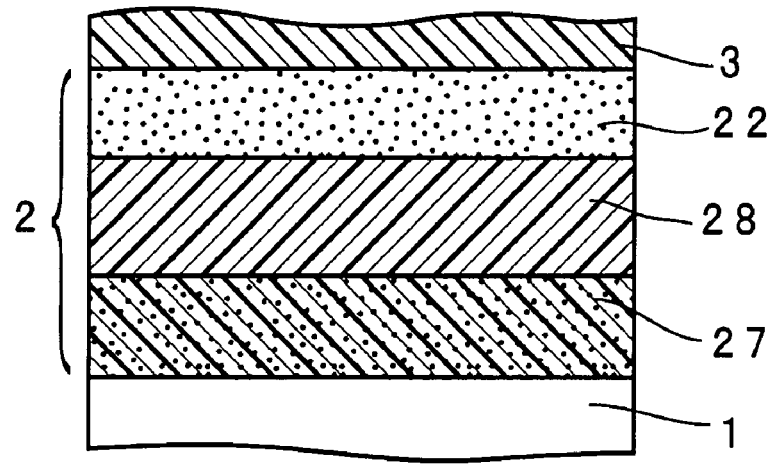
[FIG. 25]
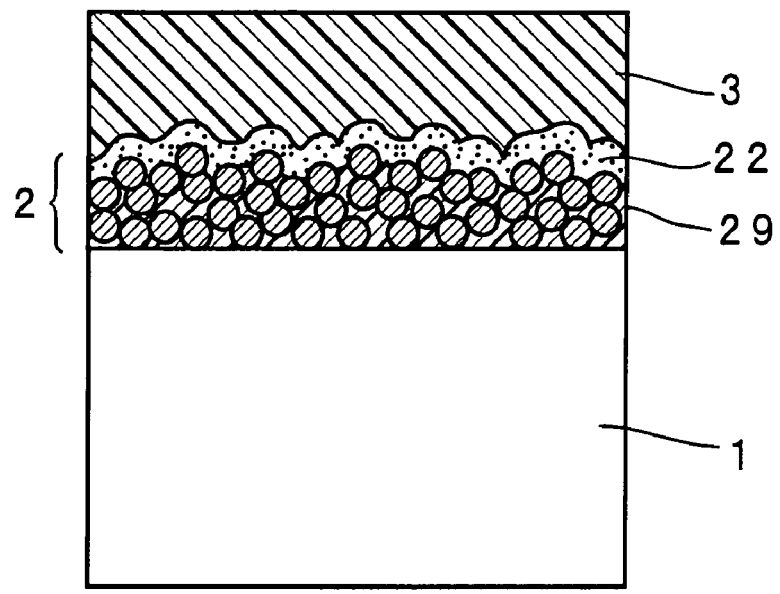

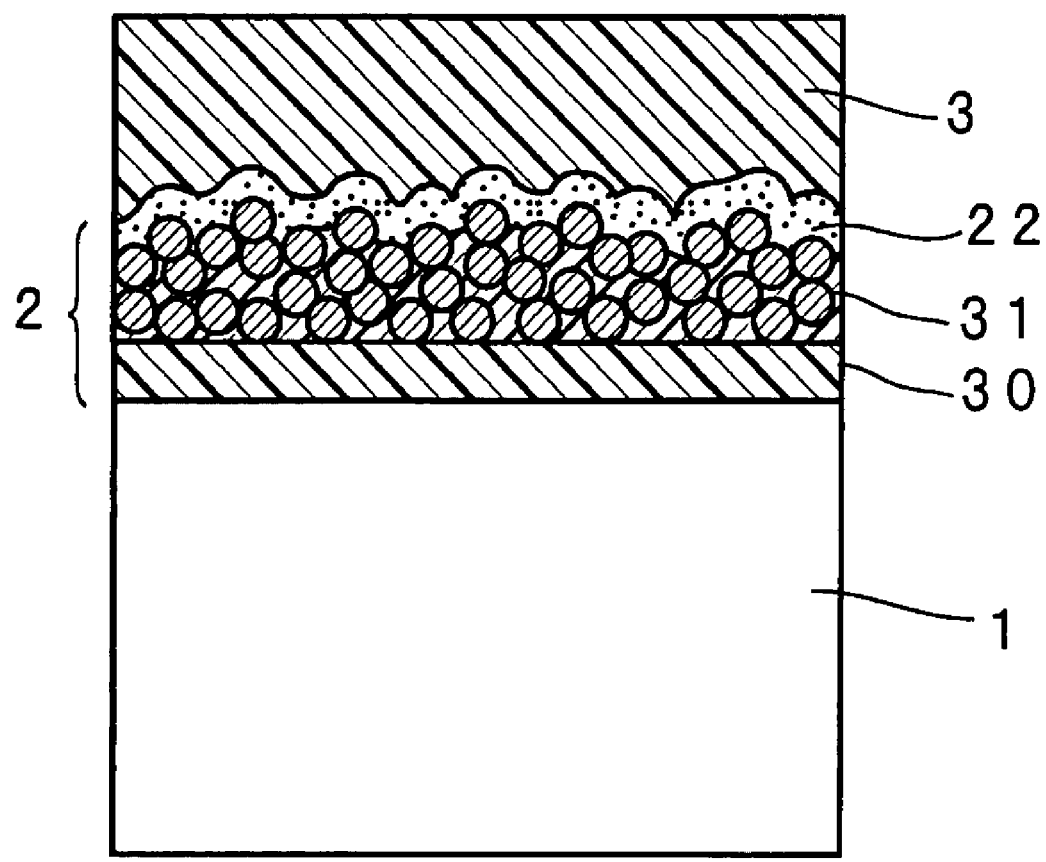
[FIG. 26]

[FIG. 27]
(a) 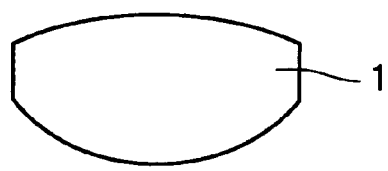
(b) 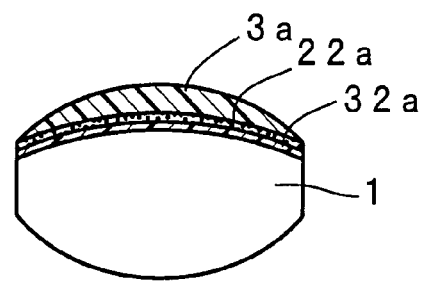
(c) 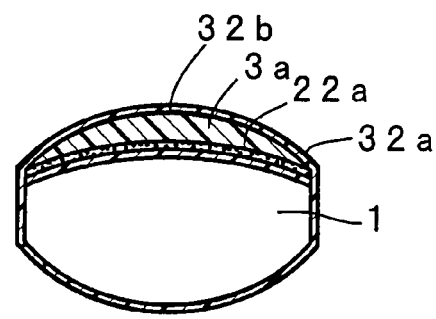
(d) 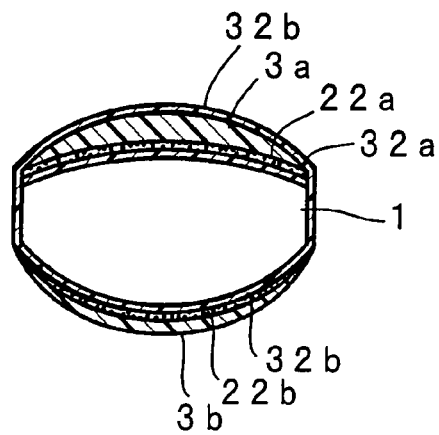

[FIG. 28]
(a)
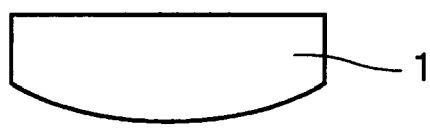
(b)
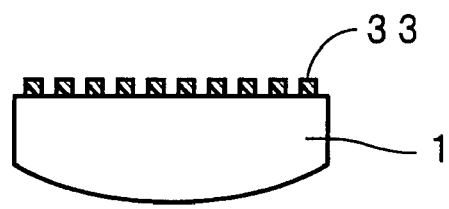
(c)
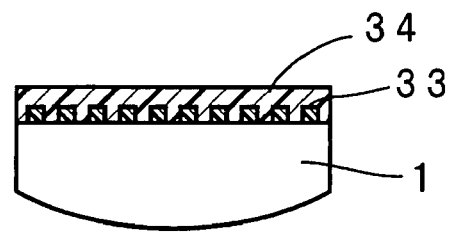
(d)
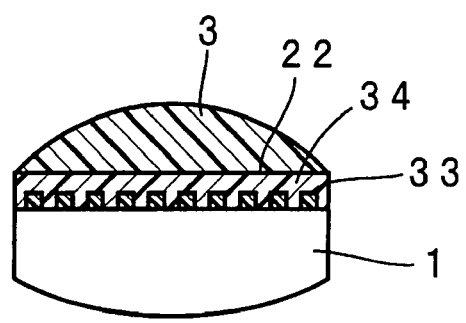

[FIG. 29]
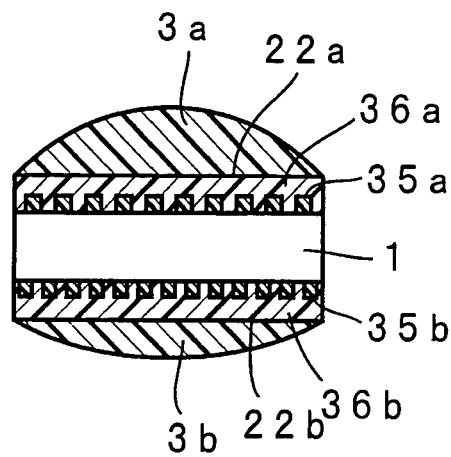
[FIG. 30]
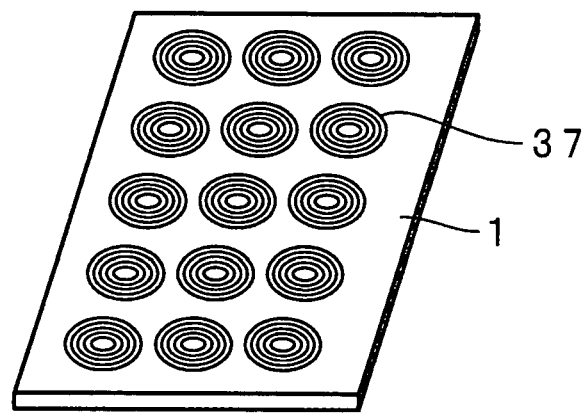
[FIG. 31]
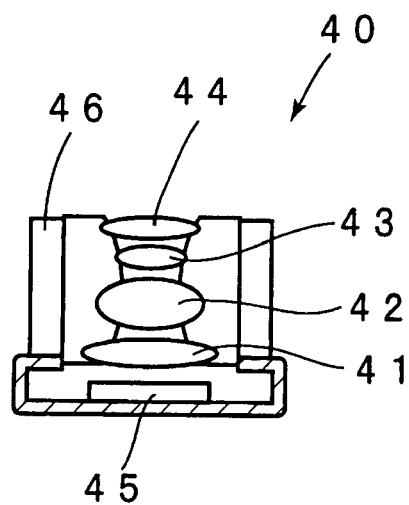

[FIG. 32]
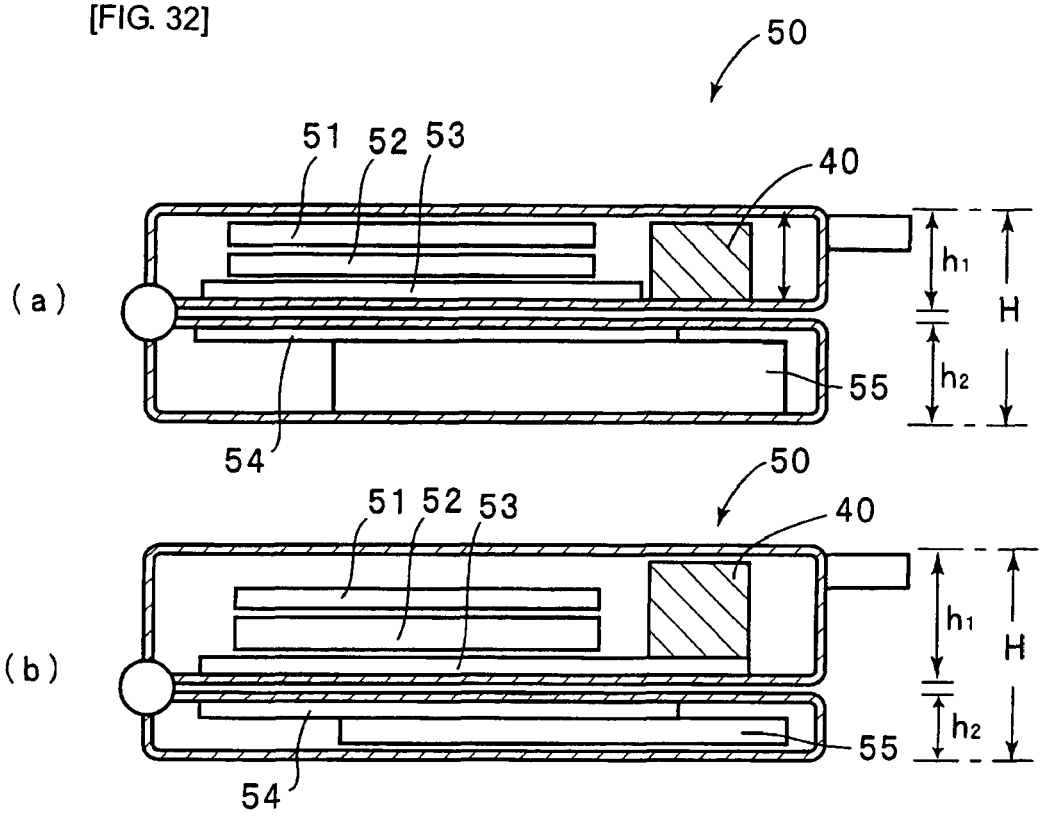
[FIG. 33]
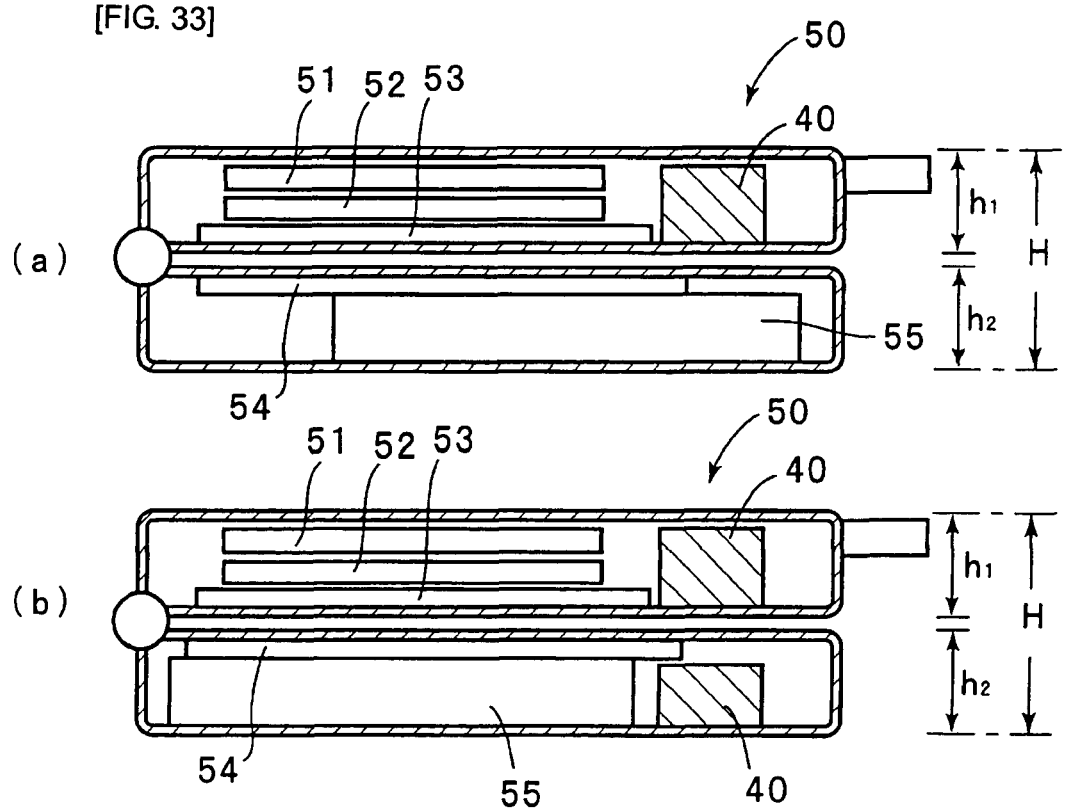

[FIG. 34]
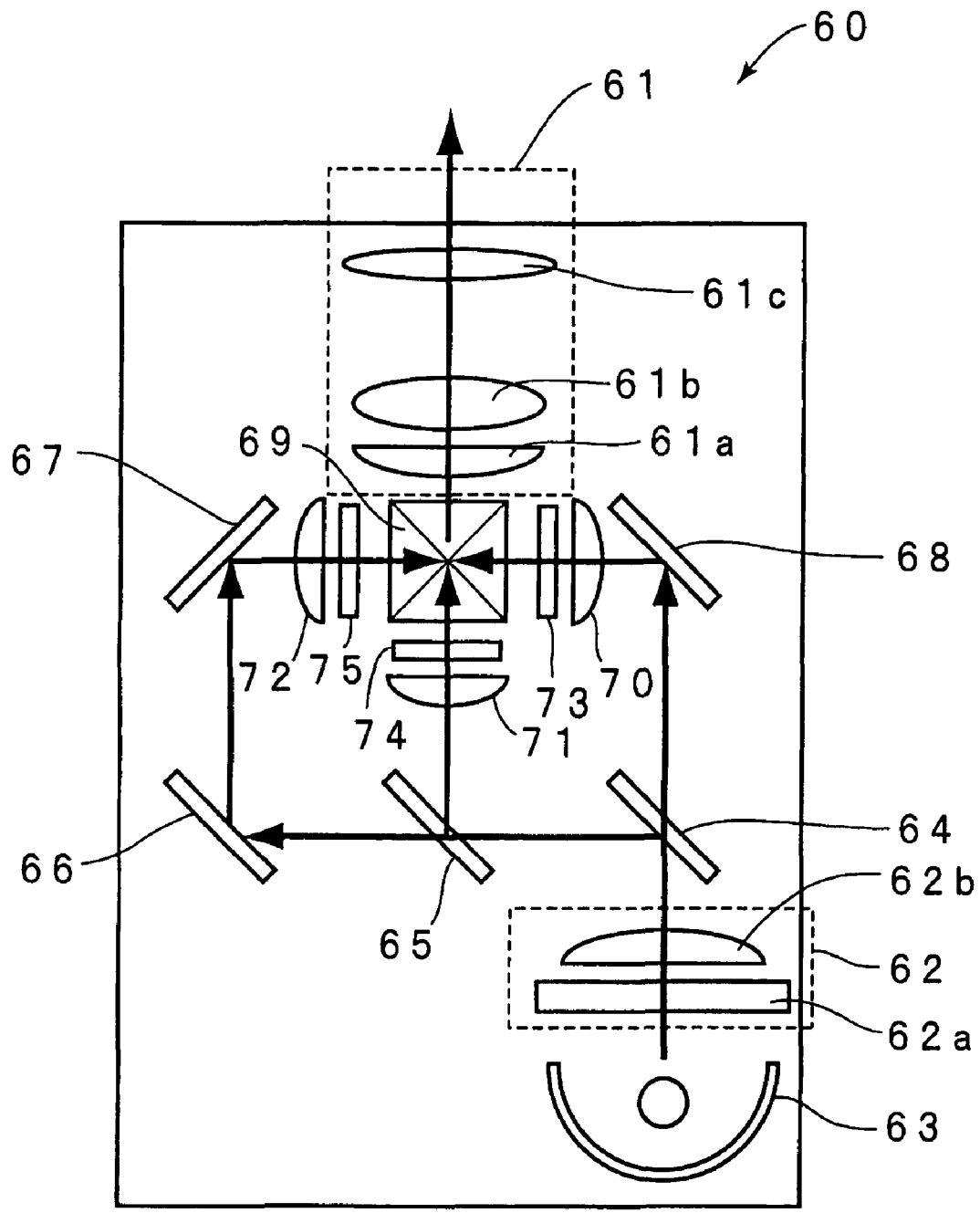

[FIG. 35]
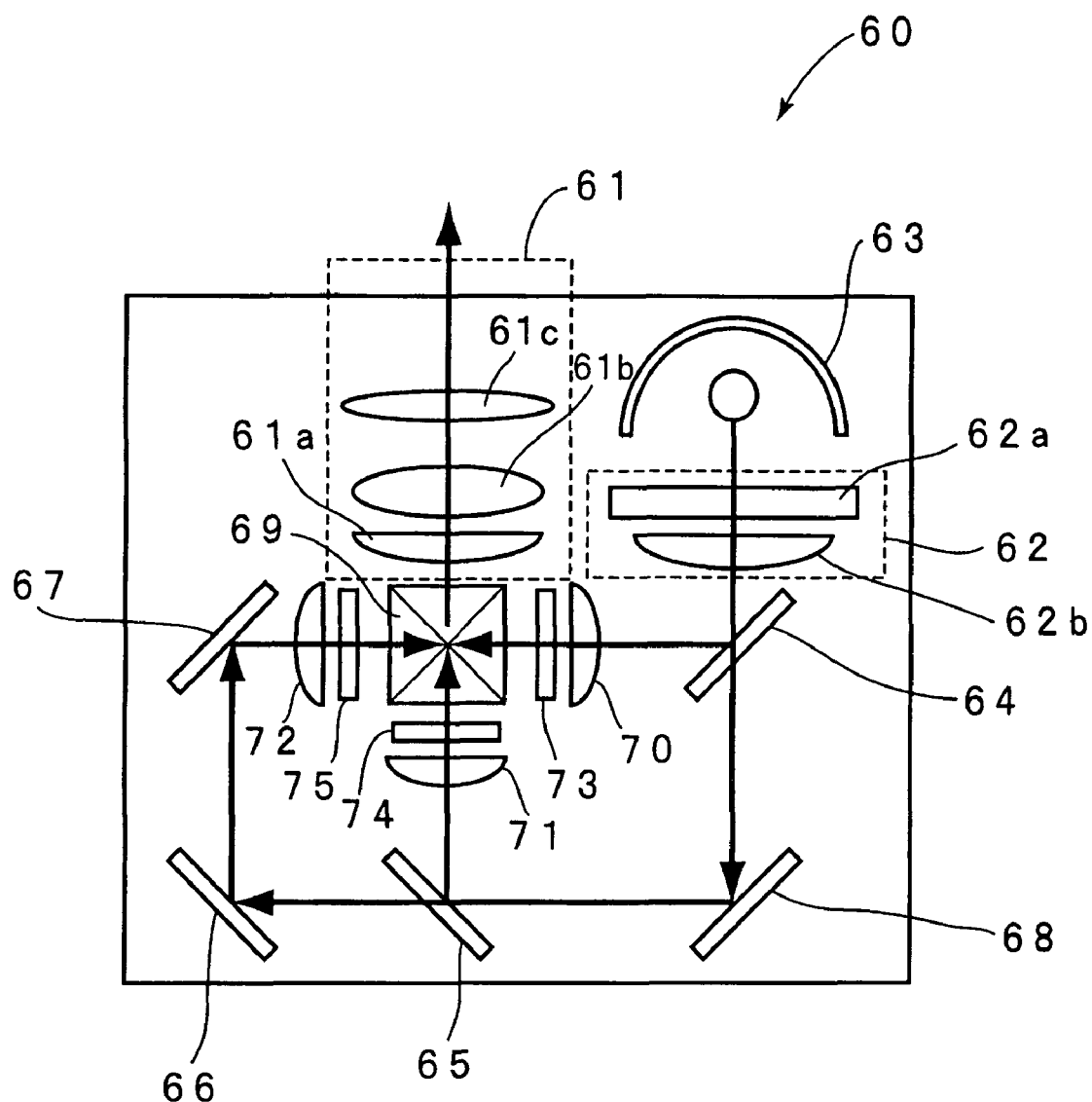

[FIG. 36]
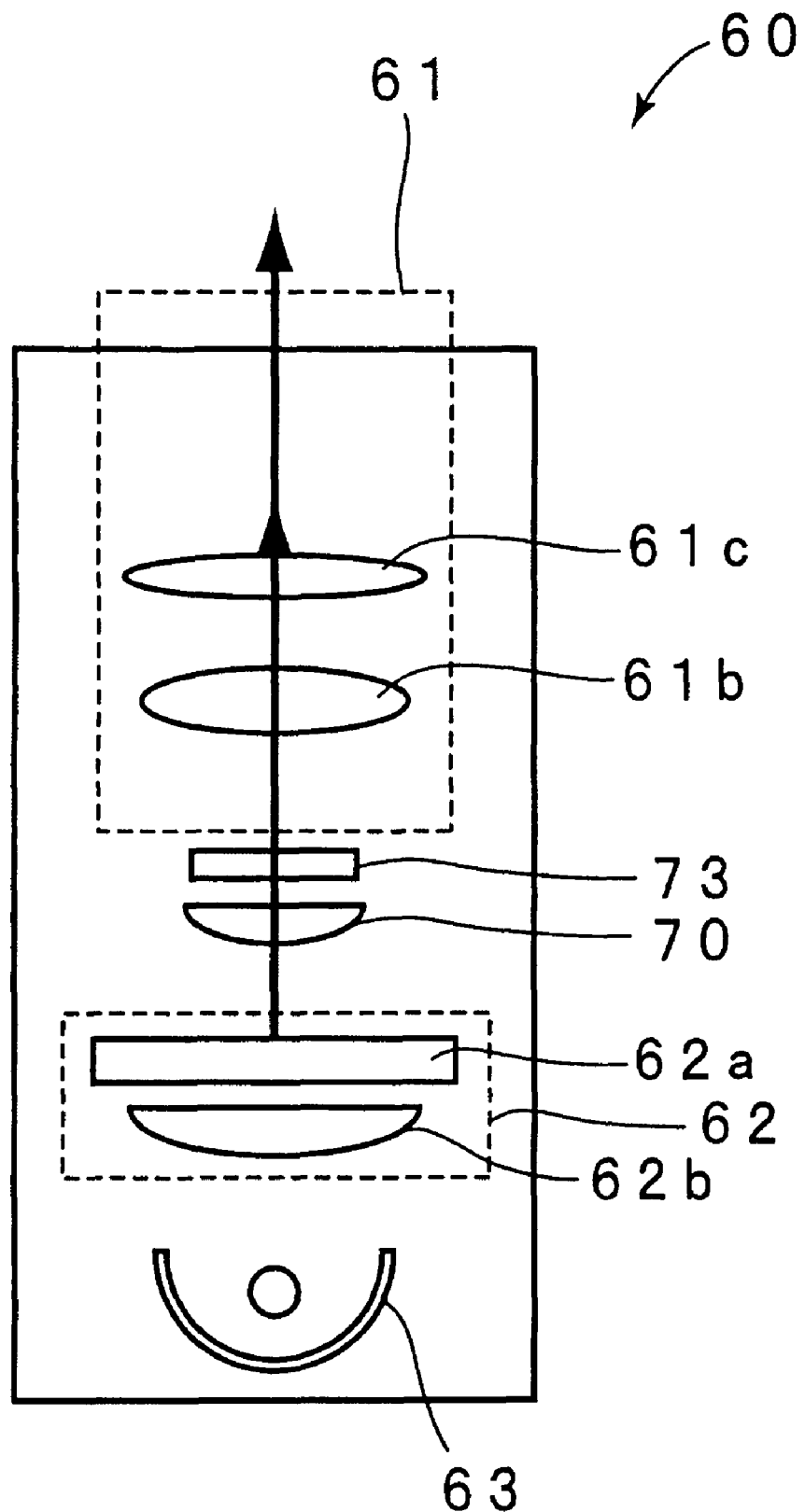

[FIG. 37]
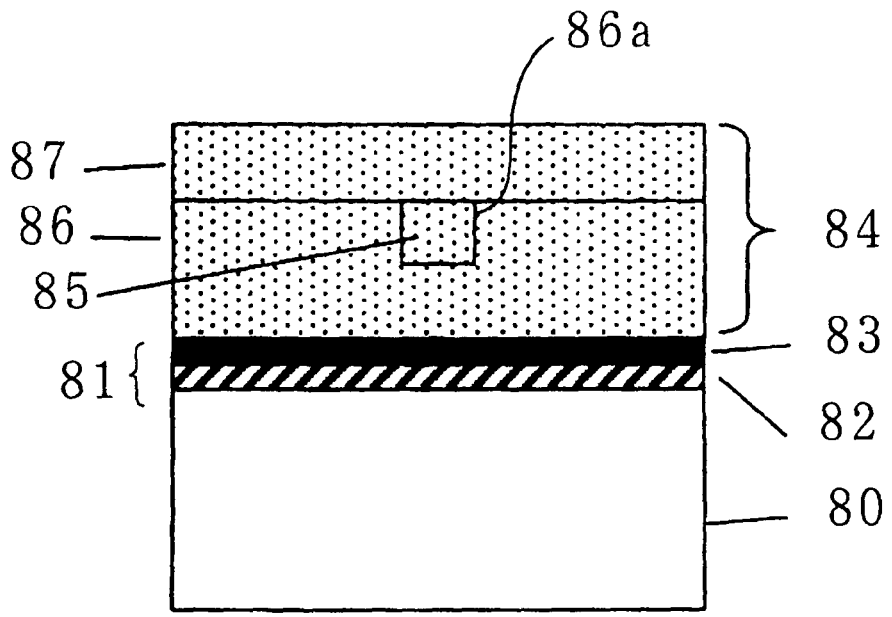
[FIG. 38]
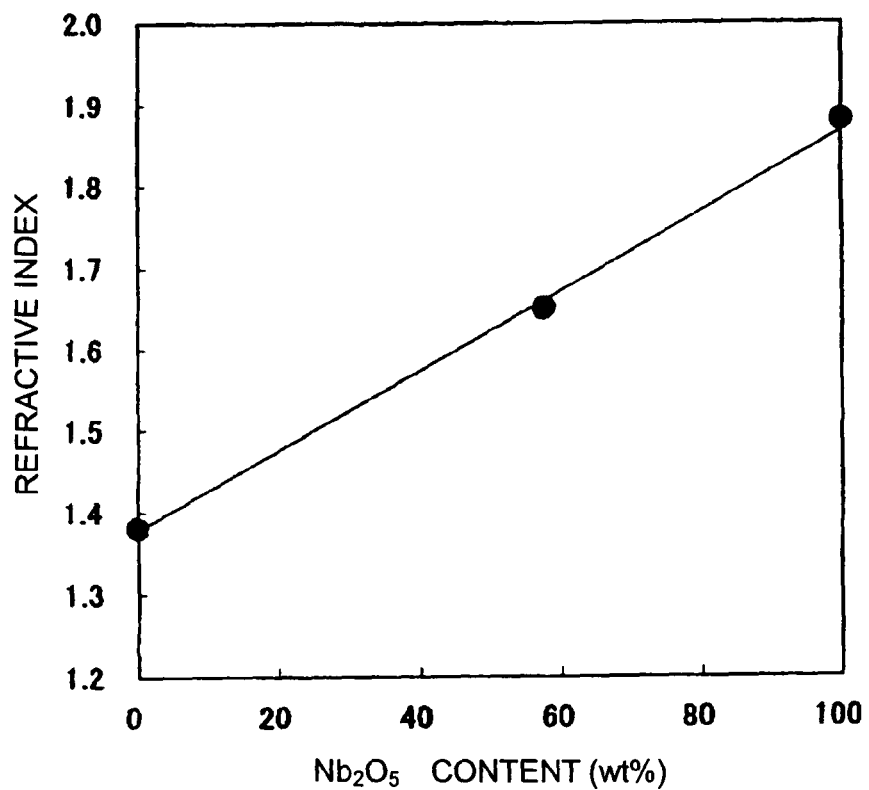

[FIG. 39]
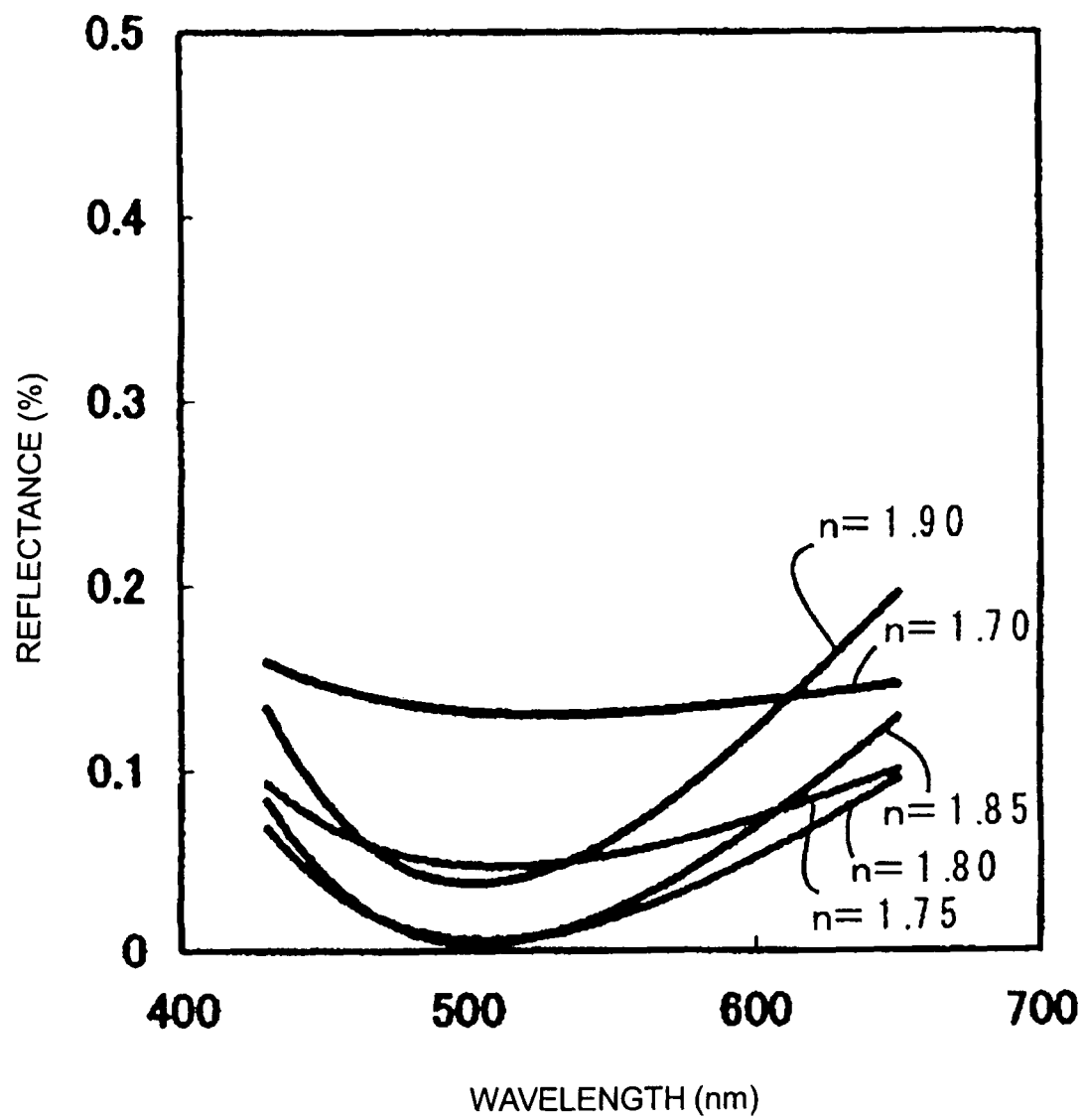

LAMINATED OPTICAL ELEMENT

TECHNICAL FIELD

The present invention relates to a laminated optical element useful for electric wiring boards, machine part materials, various coatings such as an antireflection coating and a surface protection coating, optical communication devices such as an optical transmitter and receiver module, an optical switch, and an optical modulator, optical devices such as an optical propagation path structure (e.g., an optical waveguide, an optical fiber, and a lens array) and an optical beam splitter having such an optical propagation path structure, monitor (display or liquid crystal projector)-related optical devices such as an integrator lens, a microlens array, a reflector plate, a light guide plate, and a projection screen, eyeglasses, CCD optical systems, lenses, hybrid aspherical lenses, 2P (Photo-replication Process) lenses, optical filters, diffraction gratings, interferometers, optical couplers, optical branching filters, optical sensors, hologram optical elements, other optical component materials, photovoltaic devices, contact lenses, medical artificial tissues, and molding materials for light-emitting diodes (LEDs).

BACKGROUND ART

As materials for optical elements including lenses, glass materials and plastic materials are conventionally used. There are various types of glass materials, and they offer a variety of optical properties, which makes the optical design of optical elements easy. Further, glass materials are inorganic, and therefore it is possible to obtain optical elements having high reliability. In addition, by grinding glass materials, it is possible to obtain optical elements having a high degree of accuracy.

However, in order to obtain glass optical elements having an aspherical surface other than a flat or spherical surface, it is necessary to use a special grinding machine or to mold a glass material, which can be molded at low temperature, with an expensive molding die having high heat resistance (e.g., a ceramic molding die). Therefore, the production cost of such a glass optical element is high and the resulting glass optical element is very expensive.

On the other hand, optical elements using synthetic resins (plastics) can be produced at low cost by injection molding or casting. However, such optical elements have a problem in that they have low heat resistance, high thermal expansion, narrow range of choices in their optical properties such as refractive index, and low reliability.

In order to solve the above problems, there are proposed hybrid optical elements intended to have desired properties by laminating a resin layer on a glass substrate. For example, Japanese Patent Application Laid-open No. Sho 54-6006 discloses a low-pass filter obtained by forming an organic polymer layer on a flat glass substrate. Japanese Patent Application Laid-open Nos. Sho 52-25651 and Hei 6-222201 disclose aspherical lenses obtained by forming an aspherical resin layer on a glass lens substrate, that is, so-called hybrid aspherical lenses.

In recent years, such hybrid optical elements have come into use in various fields, and therefore reliability required of these hybrid optical elements is becoming increasingly higher. For example, there is a case where hybrid optical elements need to have durability to withstand exposure to a high temperature of 85° C. and a high humidity of 85% for 500 to 1,000 hours.

In order to achieve such durability, a hybrid optical element is conventionally formed by coating a silane coupling agent diluted with a solvent on a substrate and then forming a resin layer on the silane coupling agent coating to improve adhesion between the substrate and the resin layer. However, such a laminated optical element involves a problem that it is difficult for the optical resin layer to keep good adhesion to the substrate under severe conditions and therefore the separation of the optical resin layer is likely to occur.

The problem of separation of the optical resin layer can be solved by increasing the silane coupling agent content of the silane coupling agent coating, but this method causes another problem that the surface of the silane coupling agent coating becomes clouded or the silane coupling agent cannot be coated on the substrate evenly, that is, uneven coating occurs.

Japanese Patent Application Laid-open No. Hei 5-100104 discloses a hybrid optical element having a dielectric multilayer film comprising $SiO_2/ZrO_2/SiO_2$ layers, the dielectric multilayer film being formed on a high refractive index glass substrate, whose high refractive index oxide content is high and a silica ($SiO_2$) content is low, to prevent reflection caused by the difference in refractive index between the high refractive index glass substrate (refractive index: about 1.8 to 2.0) and an optical resin layer (refractive index: about 1.5).

Usually, as described above, adhesion between a glass substrate and an optical resin layer is improved by coating a silane coupling agent on the glass substrate because the silane coupling agent has the effect of improving the adhesion of the optical resin layer to silica. However, in a case where a high refractive index glass whose silica ($SiO_2$) content is low is used as a glass substrate, adhesion between the glass substrate and the optical resin layer cannot be improved by the silane coupling agent. Although, as described above, the hybrid optical element disclosed in Japanese Patent Application Laid-open No. Hei 5-100104 uses a high refractive index glass as a glass substrate, the optical resin layer has good adhesion to the glass substrate because an $SiO_2$ layer is provided as the uppermost layer of the dielectric multilayer film. However, the dielectric multilayer film is formed by vacuum evaporation, ion plating, or sputtering, which makes it difficult to produce such an optical element at low cost in a short time.

SUMMARY OF THE INVENTION

It is therefore a first object of the present invention to provide a highly-reliable laminated optical element that is a hybrid optical element obtained by laminating an optical resin layer on an optical substrate such as a glass substrate, the optical resin layer being less likely to be separated from the optical substrate even under high temperature and high humidity conditions.

It is a second object of the present invention to provide a laminated optical element that is a hybrid optical element obtained by laminating an optical resin layer on an optical substrate such as a glass substrate, the optical resin layer having good adhesion to the optical substrate even when the optical substrate is a high refractive index glass substrate.

A first aspect of the present invention is directed to a laminated optical element comprising an optical substrate made of an optical material, an intermediate layer provided on the optical substrate, and an optical resin layer provided on the intermediate layer, wherein the optical resin layer is made of a resin composed of an organometallic polymer having an -M-O-M- bond (M is a metal atom), a metal alkoxide and/or a hydrolysate thereof having only one hydrolyzable group, and an organic polymer having a urethane bond and a methacryloxy group or an acryloxy group, and wherein the intermediate layer has a layer obtained by dispersing metal oxide microparticles in a matrix resin composed of a metal alkoxide and/or a hydrolysate thereof having a radical polymerizable group and a hydrolyzable group.

The first aspect of the present invention is characterized in that the intermediate layer is provided between the optical substrate and the optical resin layer, and the intermediate layer has a layer obtained by dispersing metal oxide microparticles in a matrix resin composed of a metal alkoxide and/or a hydrolysate thereof having a radical polymerizable group and a hydrolyzable group. The intermediate layer obtained by dispersing metal oxide microparticles in a matrix resin improves the adhesion between the optical substrate and the optical resin layer. Therefore, the optical resin layer is not easily separated from the optical substrate even under high temperature and high humidity conditions, thereby enabling a highly-reliable laminated optical element to be obtained.

In the first aspect of the present invention, the intermediate layer may comprise at least two layers. In this case, at least one of these layers shall be a layer obtained by dispersing microparticles in a matrix resin.

In the first aspect of the present invention, both the matrix resin constituting the intermediate layer and the resin constituting the optical resin layer may be curable by irradiation with energy rays. By forming each of the intermediate layer and the optical resin layer using a resin curable by irradiation with energy rays, it is possible to further improve the adhesion between the intermediate layer and the optical resin layer.

In the first aspect of the present invention, the intermediate layer may have surface irregularities formed by, for example, removing the microparticles contained in the surface of the intermediate layer and its vicinity by dissolving them.

A second aspect of the present invention is directed to a laminated optical element comprising an optical substrate made of an optical material, an intermediate layer provided on the optical substrate, and an optical resin layer provided on the intermediate layer, wherein the optical resin layer is made of a resin composed of an organometallic polymer having an -M-O-M- bond (M is a metal atom), and a metal alkoxide and/or a hydrolysate thereof having only one hydrolyzable group, and an organic polymer having a urethane bond and a methacryloxy group or an acryloxy group, and wherein the intermediate layer has a microparticle layer provided on the optical substrate side thereof and a coupling layer provided on the optical resin layer side thereof, the microparticle layer being formed using a microparticle dispersion liquid and the coupling layer being composed of a metal alkoxide and/or a hydrolysate thereof having a radical polymerizable group and a hydrolyzable group.

In the second aspect of the present invention, the intermediate layer having a microparticle layer provided on the optical substrate side thereof and a coupling layer provided on the optical resin layer side thereof is preferably formed by laminating the microparticle layer and the coupling layer together.

According to the second aspect of the present invention, the microparticle layer is provided on the optical substrate and the coupling layer is provided on the microparticle layer. Therefore, even when the optical substrate is made of a high refractive index glass, the optical resin layer can have good adhesion to the optical substrate.

In the second aspect of the present invention, the microparticle layer is preferably formed by subjecting the microparticle dispersion liquid coated on the optical substrate to heat treatment to diffuse the component of the optical substrate into the microparticle layer. The temperature of the heat treatment is preferably in the range of 300 to 500° C.

For example, by baking a dispersion liquid of microparticles, such as $SiO_2$ microparticles, coated on an optical substrate at a temperature in the range of 300 to 500° C., it is possible to form, on the optical substrate, a layer in which the microparticles such as $SiO_2$ microparticles agglomerate. Further, by forming a coupling layer on such a microparticle layer and then forming an optical resin layer on the coupling layer, it is possible to allow the optical resin layer to have good adhesion to the optical substrate.

As described above, when the microparticle layer is baked at a predetermined temperature, for example, 300 to 500° C., a component of the optical substrate other than silica, such as $TiO_2$, is diffused into the microparticle layer, thereby improving the adhesion between the optical substrate and the microparticle layer. Further, the concentration of silica of the microparticle layer becomes higher on the coupling layer side thereof. As a result, a silica concentration gradient is generated in the microparticle layer so that the concentration of the component other than silica is higher on the optical substrate side thereof and the concentration of silica is higher on the coupling layer side thereof. This makes it possible to simultaneously improve the adhesion between the optical substrate and the microparticle layer and the adhesion between the microparticle layer and the coupling layer. In addition, by baking the microparticle layer at the predetermined temperature described above, it is possible to enhance the strength of the microparticle layer itself.

In the second aspect of the present invention, the microparticle layer is composed of microparticles having an average particle size of 50 nm or more, and may have surface irregularities formed by these microparticles. By allowing the microparticle layer to have surface irregularities, it is possible to increase the surface area of the interface between the microparticle layer and the coupling layer, thereby improving the adhesion between the microparticle layer and the coupling layer.

In the second aspect of the present invention, the microparticle layer may be formed by laminating together a first microparticle layer composed of microparticles having an average particle size of less than 50 nm and provided on the optical substrate side thereof and a second microparticle layer composed of microparticles having an average particle size of 50 nm or more and provided on the coupling layer side thereof. By allowing the microparticle layer to have such a structure, it is possible to increase the contact area between the optical substrate and the microparticle layer at their interface, thereby improving the adhesion between the optical substrate and the microparticle layer. In addition, it is also possible to allow the microparticle layer to have surface irregularities on the coupling layer side thereof, thereby improving the adhesion between the microparticle layer and the coupling layer.

In the second aspect of the present invention, the microparticle dispersion liquid for forming a microparticle layer may contain only microparticles as solid matter thereof. That is, the microparticle dispersion liquid may contain only microparticles and a dispersion medium. By baking such a microparticle dispersion liquid in such a manner as described above, it is possible to form a dense microparticle layer.

In the second aspect of the present invention, the microparticle dispersion liquid may contain a binder resin. By adding a binder resin, it is possible to obtain a microparticle layer having high strength without baking it at a high temperature. In addition, it is also possible to improve the adhesion between the optical substrate and the microparticle layer depending on the kind of binder resin used. Examples of the binder resin include water-soluble acrylic monomers, water-soluble resins, silane coupling agents, and photosensitive resins. Among these binder resins, those having water solubility are preferably used. When a photosensitive resin is used as the binder resin, photosensitivity is imparted to the microparticle layer. In this case, after the formation of the microparticle layer, it is possible to cure the microparticle layer by irradiation with energy rays such as ultraviolet rays. This enables the patterning of the microparticle layer.

In the second aspect of the present invention, the microparticles may be patterned to allow the microparticle layer to have an optical function such as a diffraction grating. Such a microparticle layer also serves as a lens for correcting chromatic aberration of a lens. This makes it possible to reduce the number of parts constituting an optical system.

In the second aspect of the present invention, the coupling layer may be formed so as to have a thickness of 1 nm or less. By forming the coupling layer so as to have a thickness of 1 nm or less, that is, a thickness of about one to several molecular layers, it is possible to obtain a coupling layer having a uniform thickness, thereby further improving the adhesion between the coupling layer and the optical resin layer.

In the second aspect of the present invention, the microparticle layer using the microparticle dispersion liquid may be formed by spin-coating or dipping. By doing so, microparticles are closely packed on the optical substrate to form a layer. In this state, by subjecting the microparticle layer to baking or irradiation with energy rays such as ultraviolet rays, the microparticles are bonded together or the resin filling the space between the microparticles is cured so that a dense microparticle layer is obtained.

In the second aspect of the present invention, the microparticle layer may be patterned. By baking the microparticle layer at about 140° C., it is possible to increase the film strength of the microparticle layer to the extent that microparticles can be removed with a detergent solution. Therefore, the microparticle layer can be patterned by baking the microparticle dispersion liquid coated on the optical substrate at a temperature of about 140° C., forming a patterned resist film on the surface of the microparticle layer, and dipping the microparticle layer having the resist film in a heated detergent solution to remove microparticles not covered with the resist film.

In a case where the microparticle dispersion liquid contains a photosensitive resin, the microparticle layer can be patterned by selectively exposing the microparticle layer to light and dipping the microparticle layer in a detergent solution to remove an unexposed portion thereof.

In the following description, there is a case where the term "present invention" is used for explaining matters common to the first and second aspects of the present invention.

In the present invention, the outer surface of the optical resin layer may have an aspherical shape. By allowing the outer surface of the optical resin layer to have an aspherical shape, it is possible to obtain, for example, a hybrid aspherical lens.

In the present invention, the microparticles dispersed in the intermediate layer may be dispersed also in the optical resin layer.

In the present invention, the intermediate layer may have a refractive index equal to or more than that of the optical resin layer and equal to or less than that of the optical substrate. That is, the intermediate layer may have a refractive index in a range between the refractive index of the optical substrate and the refractive index of the optical resin layer.

The microparticles to be contained in the intermediate layer are composed of at least one selected from, for example, silicon oxide, niobium oxide, and zirconium oxide.

In the present invention, the intermediate layer may have surface irregularities to allow the interface between the intermediate layer and the optical resin layer to have irregularities. By allowing the interface between the intermediate layer and the optical resin layer to have irregularities, it is possible to further improve the adhesion between the intermediate layer and the optical resin layer.

In the present invention, the intermediate layer may be formed so that the entire surface of the optical substrate is covered therewith. By dosing so, it is possible to more effectively prevent the entry of moisture and the like into the optical substrate, thereby further improving the reliability of the laminated optical element.

In the present invention, the laminated optical element may further comprise an antireflection film provided on the outer surface of the optical resin layer. Alternatively, an antireflection film may be provided on the optical substrate surface opposite to the surface on which the intermediate layer is provided.

In the present invention, the antireflection film may be formed using the same material as the intermediate layer and may have surface irregularities formed by removing microparticles contained in the surface thereof and its vicinity by dissolving them.

Hereinbelow, the optical resin layer, the intermediate layer, and the optical substrate according to the present invention will be described in detail.

<Optical Resin Layer>

In the present invention, the optical resin layer is composed of an organometallic polymer having an -M-O-M- bond (M is a metal atom), a metal alkoxide and/or a hydrolysate thereof having only one hydrolyzable group, and an organic polymer having a urethane bond and a methacryloxy group or an acryloxy group.

As described above, the organic polymer has a urethane bond and a methacryloxy group or an acryloxy group. Such an organic polymer can be obtained by, for example, reacting a polyol with a compound, having a hydroxyl group and a methacryloxy group or an acryloxy group, at an end of the polyol with the aid of a polyisocyanate such as diisocyanate.

A specific example of the organic polymer includes one having a structure represented by AC-IS-PO-IS-AC, where AC is a part having a methacryloxy group or an acryloxy group (that is, an acrylate moiety or a methacrylate moiety), IS is a part having a urethane bond (that is, an isocyanate moiety), and PO is a polyol moiety. The organic polymer having such a structure is generally referred to as an acrylate-based resin.

From the viewpoint of reducing the water absorption of the optical resin layer, an acrylate-based resin having a hydrophobic phenyl group or bisphenol A structure is preferably used.

In the above-described structure, at least one of a bond between AC-IS and a bond between IS-PO is a urethane bond. The existence of the urethane bond is important because the cohesion force of a hydrogen bond derived from the urethane bond imparts flexibility and toughness to the cured optical resin layer, thereby preventing the occurrence of cracks and the like under high temperature and high humidity conditions.

The AC part has a polymerizable group (carbon double bond), and therefore has the function of polymerizing the organic polymer itself or bonding the organic polymer to the organometallic polymer by the application of energy such as light or heat to cure the optical resin layer.

Further, by introducing a polymerizable group into the organometallic polymer, it is possible to polymerize the organometallic polymer with the AC component of the organic polymer, thereby making the bond between the organometallic polymer and the organic polymer stronger.

The PO part imparts properties such as flexibility to the organic polymer, and examples thereof include polyester-based polyols, polyether-based polyols, polycarbonate-based polyols, polycaprolactone-based polyols, and silicone-based polyols.

The organic polymer having such a structure as described above is generally referred to as a urethane acrylate-based resin.

As described above, the optical resin layer contains a metal alkoxide and/or a hydrolysate thereof having only one hydrolyzable group. The metal alkoxide and/or a hydrolysate thereof contained in the optical resin layer may be in a state where it/they is/are not bonded to the organometallic polymer or in a state where it/they is/are bonded to the organometallic polymer. It is to be noted that the hydrolysate of the metal alkoxide may be a polycondensate of the hydrolysate.

The metal alkoxide and/or a hydrolysate thereof having only one hydrolyzable group contained in the optical resin layer are/is reacted with an —OH group generated at an end of the organometallic polymer molecule to eliminate the —OH group, thereby reducing the optical propagation loss at a wavelength in the range of 1450 to 1550 nm and the water absorption coefficient of the optical resin layer.

For example, in a case where the metal atom M is Si, there is a case where an alkoxy group represented by —Si—O—R is present at an end of the organometallic polymer molecule. This alkoxy group absorbs moisture and undergoes hydrolysis, and as a result generates a silanol group as follows:

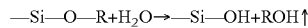
—Si—O—R+H₂O→—Si—OH+ROH↑

ROH generated by the above reaction is volatilized. If the silanol group is present in the optical resin layer, the transmittance of the optical resin layer is reduced and the water absorption coefficient of the optical resin layer is increased.

However, as described above, since the optical resin layer contains a metal alkoxide and/or a hydrolysate thereof having only one hydrolyzable group, even when the silanol group is generated in such a manner as described above, the metal alkoxide and/or a hydrolysate thereof can eliminate the —OH group. For example, alkoxysilane represented by R'₃Si—O—R" having only one alkoxy group absorbs moisture and undergoes hydrolysis as follows:

R'₃Si—O—R"+H₂O→R'₃Si—OH+R"OH↑

R"OH generated by the above reaction is volatilized. The hydrolysate generated by the above reaction is reacted with a silanol group located at an end of the organometallic polymer as follows:

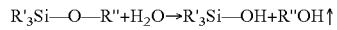
—Si—OH+R'₃Si—OH→—Si—O—SiR'₃+H₂O

As a result of the reaction, the silanol group located at an end of the organometallic polymer molecule is eliminated. This makes it possible to maintain the transmittance of the optical resin layer at a high level for a long time and to reduce the water absorption coefficient of the optical resin layer.

As described above, since the metal alkoxide undergoes hydrolysis and performs its function in the form of a hydrolysate, the metal alkoxide contained in the optical resin layer may be in the form of metal alkoxide or in the form of a hydrolysate thereof. Further, in a case where the organometallic alkoxide or a hydrolysate thereof is contained in the optical resin layer in a state where it is not bonded to the organometallic polymer, even when the organometallic polymer newly absorbs moisture to generate a silanol group or the like at the end thereof, the metal alkoxide or a hydrolysate thereof not bonded to the organometallic polymer acts on the silanol group or the like to eliminate it in such a manner as described above.

The metal alkoxide or a hydrolysate thereof may contain a fluorine atom. More specifically, a hydrogen atom contained in a hydrocarbon part of the metal alkoxide or a hydrolysate thereof may be substituted by a fluorine atom.

M in an -M-O-M- bond contained in the organometallic polymer is preferably Si, Ti, Nb, or Zr or a combination of two or more of them, particularly preferably Si. In a case where M is Si, the organometallic polymer can be formed from, for example, a silicone resin.

It is preferred that the optical resin layer further contains an organic acid anhydride and/or an organic acid.

Since an organic acid anhydride absorbs moisture and undergoes hydrolysis, when such an organic acid anhydride is contained in the optical resin layer, moisture contained in the organometallic polymer can be reduced, thereby reducing absorption resulting from moisture. Therefore, even when only an organic acid anhydride is further added, it is possible to suppress the deterioration of the material of the optical resin layer caused by moisture and to improve the transmittance of the optical resin layer. In addition, by adding an organic acid to the organometallic polymer, it is possible to promote the reaction of a silanol group or the like, thereby promoting the elimination of a silanol group or the like. For example, the organic acid can promote the reaction between terminal silanol groups of adjacent organometallic polymer molecules.

Such an organic acid anhydride and/or an organic acid are/is preferably contained in the optical resin layer for the following reason: when an organic acid anhydride and/or an organic acid are/is contained together with a metal alkoxide and/or a hydrolysate thereof having only one hydrolyzable group, in addition to the removal of moisture by the organic acid anhydride, a hydrolysate of the metal alkoxide having only one hydrolyzable group is reacted with an —OH group generated at an end of the organometallic polymer molecule to promote reaction for eliminating the —OH group.

In a case where the metal alkoxide or a hydrolysate thereof is alkoxysilane or a hydrolysate thereof, one example thereof is represented by the following general formula:

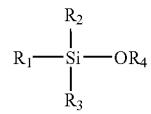

(wherein each of R₁, R₂, and R₃ is an organic group having 1 to 15 carbon atoms, preferably an alkyl group, and R₄ is an alkyl group having 1 to 4 carbon atoms).

Specific examples thereof include trialkylalkoxysilanes such as trimethylalkoxysilanes and triethylalkoxysilanes. Examples of the alkoxy group include a methoxy group and an ethoxy group.

Specific examples of the organic acid anhydride include trifluoroacetic anhydride, acetic anhydride, and propionic anhydride. Particularly, trifluoroacetic anhydride is preferably used. Specific examples of the organic acid include trifluoroacetic acid, acetic acid, and propionic acid. Particularly, trifluoroacetic acid is preferably used.

The organometallic polymer can be synthesized by, for example, hydrolysis and polycondensation of an organometallic compound having at least two hydrolyzable groups.

Examples of such an organometallic compound include organic group-containing trialkoxysilanes and organic group-containing dialkoxysilanes. Examples of the organic group include alkyl groups, aryl groups, and aryl-containing groups. Among aryl groups, a phenyl group is preferred. Preferred examples of the organometallic compound include phenyltrialkoxysilanes and diphenyldialkoxysilanes. More preferred examples of the organometallic compound include phenyltriethoxysilane, phenyltrimethoxysilane, diphenyldimethoxysilane, and diphenyldiethoxysilane.

Further, as the organometallic compound, an organometallic compound having a functional group crosslinkable by heating and/or energy-ray irradiation is preferably contained. Examples of the energy ray include ultraviolet rays and electron beams. Examples of such a crosslinkable functional group include an acryloxy group, a methacryloxy group, a styryl group, an epoxy group, and a vinyl group. Therefore, trialkoxysilane having such a functional group is preferably used as the organometallic compound.

In a case where the organometallic compound has a radical polymerizable functional group such as an acryloxy group, a methacryloxy group, a styryl group or a vinyl group, a radical polymerization initiator is preferably contained. Examples of the radical polymerization initiator include 1-hydroxy-cyclohexyl-phenyl-ketone, 2-hydroxy-2-methyl-1-phenyl-propane-1-one, 2-benzyl-2-dimethylamino-1-(4-morpholinophenyl)-butanone-1, oxy-phenyl-acetic acid 2-(2-oxo-2-phenyl-acetoxy-ethoxy)-ethyl-ester, oxy-phenyl-acetic acid 2-(2-hydroxy-ethoxy)-ethyl-ester, and a mixture of two or more of them.

Further, in a case where the organometallic compound has an epoxy group, a curing agent is preferably contained. Examples of the curing agent include amine-based curing agents, imidazole-based curing agents, phosphorus-based curing agents, and acid anhydride-based curing agents. Specific examples thereof include methylhexahydrophthalic anhydride, hexahydrophthalic anhydride, and tetraethylenepentamine.

In a case where the organometallic compound having such a functional group as described above is used together with the organometallic compound having no functional group, the mixing ratio by weight between them (organometallic compound having a functional group: organometallic compound having no functional group) is preferably 5 to 95:95 to 5.

The amount of the organic polymer contained in the optical resin layer is preferably in the range of 5 to 95% by weight, more preferably in the range of 40 to 95% by weight. If the amount of the organic polymer contained in the optical resin layer is too small, cracks are likely to occur in the optical resin layer under high temperature and high humidity conditions, which becomes a major cause of absorption or scattering of light. On the other hand, if the amount of the organic polymer contained in the optical resin layer is too large, the heat resistance of the optical resin layer is lowered. This accelerates the deterioration of the optical resin layer under high temperature conditions, thereby degrading optical properties, especially light transmitting properties.

As described above, by setting the amount of the organic polymer contained in the optical resin layer to a value within 5 to 95% by weight, it is possible to obtain a more transparent optical resin layer. In this case, an optical resin layer sample having a thickness of 3 mm has a transmittance of 80% or higher at, for example, 630 nm wavelength. Further, by setting the amount of the organic polymer contained in the optical resin layer to a value within 40 to 95% by weight, it is possible to obtain a transmittance of 90% or higher.

The amount of the metal alkoxide or a hydrolysate thereof contained in the optical resin layer is preferably in the range of 0.1 to 15 parts by weight, more preferably in the range of 0.2 to 2.0 parts by weight, per 100 parts by weight of the organometallic polymer. If the amount of the metal alkoxide or a hydrolysate thereof contained in the optical resin layer is too small, OH groups remain in the optical resin layer and therefore absorption at 1450 to 1550 nm wavelength is increased and water absorption is increased so that the optical resin layer is likely to be deteriorated. On the other hand, if the amount of the metal alkoxide or a hydrolysate thereof contained in the optical resin layer is too large, excess of the metal alkoxide or a hydrolysate thereof is removed from the material of the optical resin layer in a high temperature environment, which becomes a cause of the occurrence of cracks in the optical resin layer.

The amount of the organic acid anhydride or the organic acid contained in the optical resin layer is preferably in the range of 0.1 to 10 parts by weight, more preferably in the range of 1 to 5 parts by weight, per 100 parts by weight of the organometallic polymer. If the amount of the organic acid anhydride or the organic acid contained in the optical resin layer is too small, elimination of OH groups by the metal alkoxide having only one hydrolyzable group is incompletely carried out. On the other hand, if the amount of the organic acid anhydride or the organic acid contained in the optical resin layer is too large, excess of the organic acid anhydride or organic acid itself is removed from the material of the optical resin layer in a high temperature environment, which becomes a cause of the occurrence of cracks in the optical resin layer.

Further, in the optical resin layer, the difference between the refractive index of a cured product of the organometallic polymer and the refractive index of a cured product of the organic polymer is preferably 0.01 or less. By setting the refractive index difference to 0.01 or less, it is possible to suppress scattering of light resulting from the refractive index difference at the interface between the organometallic polymer region and the organic polymer region in the material of the optical resin layer, thereby achieving a transmittance of 90% or higher.

Furthermore, in the optical resin layer, the difference in refractive index between the organometallic polymer in a liquid state before curing and the organic polymer in a liquid state before curing is preferably 0.02 or less. By setting the difference in refractive index between these polymers in a liquid state before curing to 0.02 or less, it is possible for a cured material of the optical resin layer to have a transmittance of 90% or higher.

The optical resin layer preferably has an absorption peak around 850 $cm^{-1}$ derived from the metal alkoxide in an IR absorption analysis chart. The existence of such an absorption peak indicates that the optical resin layer contains a sufficient amount of trimethylsilyl groups as the metal alkoxide having only one hydrolyzable group, that is, OH groups are effectively eliminated from the material of the optical resin layer.

<Intermediate Layer According to the First Aspect>

The intermediate layer according to the first aspect of the present invention is obtained by dispersing metal oxide microparticles in a matrix resin composed of a metal alkoxide and/or a hydrolysate thereof having a radical polymerizable group and a hydrolyzable group.

Examples of the metal alkoxide include radical polymerizable group-containing trialkoxysilanes and radical polymerizable group-containing dialkoxysilanes.

Examples of the radical polymerizable group include an acryloxy group, a methacryloxy group, a styryl group, and a vinyl group. As the metal alkoxide, trialkoxysilane having such a radical polymerizable group as mentioned above is particularly preferably used.

Examples of the metal oxide microparticles to be dispersed in the matrix resin include silicon oxide microparticles, niobium oxide microparticles, zirconium oxide microparticles, titanium oxide microparticles, aluminum oxide microparticles, yttrium oxide microparticles, cerium oxide microparticles, and lanthanum oxide microparticles. Among them, silicon oxide microparticles, niobium oxide microparticles, and zirconium oxide microparticles are particularly preferably used. The average particle size of the microparticles to be used in the present invention is preferably 100 nm or less, more preferably in the range of 5 to 50 nm.

The amount of the microparticles to be contained in the matrix resin of the intermediate layer according to the first aspect of the present invention is appropriately determined so that the intermediate layer can have a desired refractive index. In general, the amount of the microparticles to be contained in the intermediate layer is preferably in the range of 0.5 to 50% by weight.

The intermediate layer according to the first aspect of the present invention is cured by polymerizing radical polymerizable groups contained in the molecules of the metal alkoxide and/or a hydrolysate thereof by, for example, heating or irradiation with energy rays such as ultraviolet rays.

The intermediate layer may further contain the radical polymerization initiator described with reference to the optical rein layer.

By adding microparticles having a low refractive index to the intermediate layer, it is possible to control the refractive index of the intermediate layer so that the intermediate layer can have a low refractive index. On the other hand, by adding microparticles having a high refractive index to the intermediate layer, it is possible to control the refractive index of the intermediate layer so that the intermediate layer can have a high refractive index. Examples of metal oxide particles that can increase the refractive index of the intermediate layer include niobium oxide ($Nb_2O_5$) particles, zirconium oxide ($ZrO_2$) particles, and titanium oxide ($TiO_2$) particles. An Example of microparticles that can decrease the refractive index of the intermediate layer includes silicon oxide ($SiO_2$) particles.

It is to be noted that, as described above, such microparticles may be contained also in the optical resin layer.

<Intermediate Layer According to the Second Aspect>

The intermediate layer according to the second aspect of the present invention comprises a microparticle layer provided on the optical substrate side thereof and a coupling layer provided on the optical resin layer side thereof.

Examples of microparticles to be used in the second aspect of the present invention include those described above with reference to the first aspect of the present invention.

Examples of a metal alkoxide and/or a hydrolysate thereof constituting the coupling layer according to the second aspect of the present invention include those described above with reference to the first aspect of the present invention.

The microparticle layer according to the second aspect of the present invention may have a laminated structure comprising two or more layers. In this case, these two or more layers may have different microparticles from each other.

As described above, examples of the binder resin to be used in the second aspect of the present invention include water-soluble acrylic monomers, water-soluble resins, silane coupling agents, and photosensitive resins.

Examples of the water-soluble acrylic monomers include 2-hydroxyethyl methacrylate, 2-hydroxypropyl methacrylate, and 2-dimethylaminoethyl methacrylate.

Examples of the water-soluble resins include epoxy-based resins such as polyethyleneglycol diglycidyl ether, acrylic resins such as polyacrylic esters and polymethacrylic esters, and silicone-based resins obtained by adding a hydrophilic group to a siloxane bond that is a main chain of polysiloxane.

Examples of the silane coupling agents include a methacryloxy silane coupling agent such as 3-methacryloxypropyltrimethoxysilane, an epoxy-based silane coupling agent such as 3-glycidoxypropyltrimethoxysilane, and a styryl-based silane coupling agent such as a hydrolysate of p-styryltrimethoxysilane or a polymer thereof.

Examples of the photosensitive resins include the above-mentioned water-soluble acrylic monomers and water-soluble acrylic resins.

Examples of the detergent solution to be used for patterning of the microparticle layer in the second aspect of the present invention include those used for cleaning optical parts.

<Optical Substrate>

Examples of the optical substrate to be used in the present invention include translucent glass, ceramic, and plastic members. In a case where a laminated optical element having a small thickness is formed, a high refractive index glass member, a high refractive index translucent ceramic member or the like can be used as the optical substrate.

<Laminated Optical Element>

Examples of the laminated optical element according to the present invention include hybrid aspherical lenses. A hybrid aspherical lens is an aspherical lens obtained by forming a translucent resin layer as a light transmitting region on a spherical lens made of glass or the like. As described above, since the laminated optical element according to the present invention has an intermediate layer provided between an optical substrate such as a spherical lens and an optical resin layer that is a translucent resin layer, the optical resin layer has good adhesion to the optical substrate. Further, the optical resin layer to be used in the present invention is composed of a material having high hardness and high heat resistance, and therefore the laminated optical element according to the present invention has high reliability under high temperature and high humidity conditions and has high hardness and high heat resistance.

As described above, since the laminated optical element according to the present invention has high reliability under high temperature and high humidity conditions and has high hardness and high heat resistance, it can be used for producing electric wiring boards, machine part materials, various coatings such as an antireflection coating and a surface protection coating, optical communication devices such as an optical transmitter and receiver module, an optical switch, and an optical modulator, optical devices such as an optical propagation path structure (e.g., an optical waveguide, an optical fiber, and a lens array) and an optical beam splitter containing such an optical propagation path structure, monitor (display or liquid crystal projector)-related optical devices such as an integrator lens, a microlens array, a reflector plate, a light guide plate, and a projection screen, eyeglasses, CCD optical systems, lenses, hybrid aspherical lenses, 2P (Photo-replication Process) lenses, optical filters, diffraction gratings, interferometers, optical couplers, optical branching filters, optical sensors, hologram optical elements, other optical component materials, photovoltaic devices, contact lenses, medical artificial tissues, and molding materials for light-emitting diodes (LEDs).

A camera module according to the present invention comprises a lens combination of two or more lenses, an image pickup device, and a holder for holding them, and at least one of the two or more lenses is the laminated optical element according to the present invention.

A mobile phone according to the present invention comprises the camera module according to the present invention.

A liquid crystal projector according to the present invention comprises a light source, an illumination optical system, a liquid crystal section including liquid crystal, half mirrors, mirrors, and lenses, and a projection optical system, and the projection optical system equipped with hybrid aspherical lenses according to the present invention is provided adjacent to the light source.

Effect of the Invention

The laminated optical element according to the present invention has an intermediate layer obtained by dispersing metal oxide microparticles in a matrix resin composed of a metal alkoxide and/or a hydrolysate thereof having a radical polymerizable group and a hydrolyzable group, and the intermediate layer is provided between an optical substrate and an optical resin layer so that the optical resin layer can have good adhesion to the optical substrate. Therefore, the laminated optical element according to the present invention has high reliability under high temperature and high humidity conditions and has high hardness and high heat resistance.

BRIEF DESCRIPTION OF THE DRAWINGS

FIG. 1 is a cross-sectional view which shows the cross sectional structure of a laminated optical element of Example 1 according to the present invention.

FIG. 2 is a cross-sectional view which shows the cross sectional structure of a laminated optical element of Example 2 according to the present invention.

FIG. 3 is a cross-sectional view which shows the cross sectional structure of a laminated optical element of Example 3 according to the present invention.

FIG. 4 is a cross-sectional view which shows the cross sectional structure of a laminated optical element of Example 5 according to the present invention.

FIG. 5 is a diagram which shows the structure of a matrix resin layer in an intermediate layer of the laminated optical element shown in FIG. 4.

FIG. 6 is a cross-sectional view which shows the cross sectional structure of a laminated optical element of Example 6 according to the present invention.

FIG. 7 is a cross-sectional view which shows the cross sectional structure of a laminated optical element of Example 7 according to the present invention.

FIG. 8 is a cross-sectional view taken along the A-A line shown in FIG. 7.

FIG. 9 is a cross-sectional view which shows the cross sectional structure of a laminated optical element of Example 8 according to the present invention.

FIG. 10 is a cross-sectional view which shows the structure of an antireflection film 13 shown in FIG. 9.

FIGS. 11($a$) to 11($e$) are cross-sectional views which show the production steps of a hybrid aspherical lens that is a laminated optical element of each of the Examples according to the present invention.

FIG. 12 is a cross-sectional view of a hybrid aspherical lens of Comparative Example 1.

FIG. 13 is a cross-sectional view taken along the A-A line shown in FIG. 12.

FIG. 14 is a cross-sectional view which shows the cross sectional structure of a hybrid aspherical lens of Comparative Example 2.

FIG. 15 is a cross-sectional view which shows the cross sectional structure of a hybrid aspherical lens of Comparative Example 3.

FIG. 16 is a cross-sectional view which shows the cross sectional structure of a hybrid aspherical lens of Comparative Example 4.

FIG. 17 is a schematic diagram which shows an apparatus for observing spherical aberration of a hybrid aspherical lens.

FIG. 18($a$) is a diagram which shows a mesh pattern observed through a spherical glass lens and FIG. 18($b$) is a diagram which shows a mesh pattern observed through a hybrid aspherical lens.

FIG. 19 is a cross-sectional view which shows the cross sectional structure of a laminated optical element of Example 9 according to the present invention.

FIG. 20 is an enlarged cross-sectional view which shows the cross sectional structure of the laminated optical element of the Example 9 according to the present invention.

FIG. 21 is a cross-sectional view which shows the cross sectional structure of a laminated optical element of Example 10 according to the present invention.

FIG. 22 is an enlarged cross-sectional view which shows the cross sectional structure of the laminated optical element of the Example 10 according to the present invention.

FIG. 23 is a cross-sectional view which shows the cross sectional structure of a laminated optical element of Example 11 according to the present invention.

FIG. 24 is an enlarged cross-sectional view which shows the cross sectional structure of the laminated optical element of the Example 11 according to the present invention.

FIG. 25 is a cross-sectional view which shows the cross sectional structure of a laminated optical element of Example 12 according to the present invention.

FIG. 26 is a cross-sectional view which shows the cross sectional structure of a laminated optical element of Example 13 according to the present invention.

FIGS. 27($a$) to 27($d$) are cross-sectional views which show the production steps of a laminated optical element of Example 14 according to the present invention.

FIGS. 28($a$) to 28($d$) are cross-sectional views which show the production steps of a laminated optical element of Example 15 according to the present invention.

FIG. 29 is a cross-sectional view which shows the cross sectional structure of a laminated optical element of Example 16 according to the present invention.

FIG. 30 is a perspective view which shows a state where a plurality of optical elements are formed on a plate-like optical substrate according to the present invention.

FIG. 31 is a cross-sectional view of a camera module equipped with the laminated optical element according to the present invention.

FIGS. 32($a$) and 32($b$) are cross-sectional views of mobile phones each equipped with a conventional camera module.

FIGS. 33($a$) and 33($b$) are cross-sectional views of mobile phones each equipped with a camera module using the laminated optical element according to the present invention.

FIG. 34 is a cross-sectional view which schematically shows a liquid crystal projector equipped with the laminated optical elements according to the present invention.

FIG. 35 is a cross-sectional view which schematically shows a liquid crystal projector equipped with the laminated optical elements according to the present invention.

FIG. 36 is a cross-sectional view which schematically shows a liquid crystal projector equipped with the laminated optical elements according to the present invention.

FIG. 37 is a cross-sectional view of an optical waveguide according to the present invention.

FIG. 38 is a graph which shows the relationship between the $Nb_2O_5$ content of a mixed microparticle layer and the refractive index of the mixed microparticle layer.

FIG. 39 is a graph which shows the relationship between the refractive index of a substrate and the reflectance of the mixed microparticle layer.

DESCRIPTION OF THE SYMBOLS 1. optical substrate
2. intermediate layer
3. optical resin layer
4. matrix resin layer
5. microparticles
6. coupling agent layer
7,8. antireflection film
9. matrix resin layer
21, 23-31, 32a, 32b, 33, 34, 35a, 35b, 36a, 36b. microparticle layer
22. coupling layer
40. camera module
41, 42, 43, 44. aspherical lens
45. image pickup device
50. mobile phone
51. TV tuner
52. hard disk drive
53. display
54. key board
55. battery
60. liquid crystal projector
61. projection optical system
62. illumination optical system
63. light source
64,65. half mirror
66,67,68. mirror
69. cross prism
70,71,72. lens
73,74,75. liquid crystal panel
80. substrate
81. intermediate layer
82. microparticle layer
83. coupling layer
84. optical resin layer
85. core layer
86. lower clad layer
86a. groove of the lower clad layer
87. upper clad layer

BEST MODE FOR CARRYING OUT THE INVENTION

Hereinbelow, the present invention will be described in more detail with reference to the following examples, but the present invention is not limited to these examples.

(Coupling Agent Solution 1)

3-methacryloxypropyltrimethoxysilane (MPTMS) was diluted with ethanol to prepare a coupling agent solution 1 containing 2% by weight of MPTMS.

When such a solution is coated by, for example, spin-coating on the surface of a substrate, the MPTMS is hydrolyzed by moisture in the air to generate OH groups. Each of the OH groups forms a hydrogen bond with the substrate. Further, an organic group (i.e., a methacryloxypropyl moiety) contained in the hydrolyzed MPTMS is compatible with an organic material such as a resin, thereby improving the adhesion between the substrate and a resin layer.

(Coupling Agent Solution 2)

6.8 g of MPTMS was added to 13 g of ethanol, and the resulting mixture was stirred. Then, 8 g of pure water and 1.6 g of 2N hydrochloric acid were further added thereto, and the resulting mixture was stirred and left standing for 72 hours to prepare a coupling agent solution 2.

In the case of the coupling agent solution 2, addition of hydrochloric acid actively promotes hydrolysis and polycondensation of the MPTMS so that these reactions can sufficiently proceed. Therefore, the coupling agent solution 2 has high viscosity. By using the coupling agent solution 2, it is possible to form a coupling agent layer having a thickness larger than that of a coupling agent layer formed using the coupling agent solution 1.

(Coupling Agent Solution 3)

The coupling agent solution 2 was further diluted with 200 g of ethanol to prepare a coupling agent solution 3.

(Silicon Oxide Particle Dispersion Liquid)

Silicon oxide particles (average particle size: 20 nm) were dispersed in ethanol to prepare a dispersion liquid containing 10% by weight of the silicon oxide particles. This dispersion liquid was mixed with the coupling agent solution 2 to prepare a silicon oxide particle dispersion liquid.

The mixing ratio between the coupling agent solution 2 and the dispersion liquid was controlled so that the resulting silicon oxide particle dispersion liquid could have a predetermined refractive index when cured by heating and/or light irradiation. In the case of such a silicon oxide particle dispersion liquid, a higher silicon oxide particle content in the silicon oxide particle dispersion liquid makes the refractive index of a cured product of the silicon oxide particle dispersion liquid lower. By controlling the silicon oxide particle content in the silicon oxide particle dispersion liquid, it is possible to adjust the refractive index nD of a cured product of the silicon oxide particle dispersion liquid at a wavelength of 589 nm to a value in the range of about 1.50 to 1.48.

Hereinbelow, unless otherwise specified, the term "silicon oxide particle dispersion liquid" means one whose silicon oxide particle content has been controlled so that a cured product thereof can have a refractive index of 1.48.

(Niobium Oxide Particle Dispersion Liquid)

4.72 g of MPTMS and 2.08 g of diphenyldimethoxysilane (DPhDMS) were added to 13 g of ethanol. Then, 8 g of pure water and 1.6 g of 2N hydrochloric acid were further added thereto, and the resulting mixture was stirred and left standing for 72 hours to prepare a solution of MPTMS and DPhDMS. Niobium oxide particles (average particle size: 10 nm) were added to ethanol to prepare a dispersion liquid containing 10% by weight of the niobium oxide particles. This dispersion liquid was mixed with the solution of MPTMS and DPhDMS to prepare a niobium oxide particle dispersion liquid.

The mixing ratio between the metal alkoxides and the niobium oxide particles was controlled so that a layer formed by coating the resulting niobium oxide particle dispersion liquid could have a predetermined refractive index. In the case of such a niobium oxide particle dispersion liquid, a higher niobium oxide particle content therein makes the refractive index of a cured product of the niobium oxide particle dispersion liquid higher. By controlling the niobium oxide particle content in the niobium oxide particle dispersion liquid, it is possible to adjust the refractive index nD of a cured product of the niobium oxide particle dispersion liquid at a wavelength of 589 nm to a value in the range of about 1.53 to 1.60.

Hereinbelow, unless otherwise specified, the term "niobium oxide particle dispersion liquid" means one whose niobium oxide particle content has been controlled so that a cured product thereof can have a refractive index of 1.59.

(Solution for Forming Optical Resin Layer)

10 mL (10.4 g) of MPTMS, 4.1 mL (4.4 g) of DPhDMS, and 1.65 mL (1.7 g) of 2N hydrochloric acid were added to 20.5 mL (16.2 g) of ethanol, and then they were mixed. The mixture was left standing for 24 hours to hydrolyze and polycondense the metal alkoxides. 4 mL of the thus obtained polycondensate solution was placed in a petri dish, and then 10 mg of 1-hydroxy-cyclohexyl-phenyl-ketone was added thereto as a polymerization initiator. The polymerization initiator was dissolved in the polycondensate solution, and the resulting solution was heated at 100° C. to remove ethanol by evaporation. In this way, a viscous liquid A was obtained. 1 g of the viscous liquid A, 3 mL (2.25 g) of trimethylethoxysilane, and 0.8 mL (0.41 g) of fluoroacetic anhydride were mixed, and the resulting mixture was left standing for 24 hours. Then, the mixture was heated and dried at 100° C. to remove excess of the trimethylethoxysilane and trifluoroacetic anhydride by evaporation to obtain a viscous liquid B.

0.55 g of the viscous liquid B and 0.45 g of a urethane acrylate-based photocurable resin were mixed, and the resulting mixture was stirred to obtain a solution containing 45% by weight of the urethane acrylate-based photocurable resin. The thus obtained solution was used as a solution for forming an optical resin layer (hereinafter, simply referred to as an "optical resin layer-forming solution").

EXAMPLE 1

<Production of Hybrid Aspherical Lens>

A hybrid aspherical lens was produced through the steps shown in FIGS. 11(a) to 11(e).

As shown in FIG. 11(a), a spherical lens made of glass was used as an optical substrate 1, and an intermediate layer 2 was formed on the optical substrate 1. Onto the intermediate layer 2, the optical resin layer-forming solution 3 was dropped. As the optical substrate 1, a high refractive index spherical glass lens having a diameter of 5 mm and a maximum thickness of 1 mm (refractive index of glass nD: about 1.8) was used. The intermediate layer 2 was formed by heating the silicon oxide particle dispersion liquid spin-coated on the optical substrate 1 at 100° C. for 1 hour.

As shown in FIG. 11(b), a nickel mold 10 having an aspherical inner surface was pressed against the optical resin layer-forming solution 3, and then, as shown in FIG. 11(c), the optical resin layer-forming solution 3 was cured by irradiation with ultraviolet rays from the optical substrate 1 side to form an optical resin layer 3. More specifically, the optical resin layer-forming solution 3 was cured by irradiation with ultraviolet rays emitted from a high-pressure mercury lamp (intensity: about 40 mW/cm$^2$) from the optical substrate 1 side for 6 minutes to form an optical resin layer 3, and then, as shown in FIG. 11(d), the mold 10 was removed from the optical resin layer 3. Then, the optical resin layer 3 was further cured by irradiation with ultraviolet rays emitted from a high-pressure mercury lamp (intensity: about 40 mW/cm$^2$) from the optical resin layer 3 side for 10 minutes.

In this way, a hybrid aspherical lens shown in FIG. 11(e) was obtained.

FIG. 1 is a cross-sectional view taken along the A-A line shown in FIG. 11(e). As shown in FIG. 1, the intermediate layer 2 is provided on the optical substrate 1, and the optical resin layer 3 is provided on the intermediate layer 2. Although not shown in FIG. 11(e), an antireflection film 7 is provided on the outer surface of the optical resin layer 3 and an antireflection film 8 is provided on the surface of the optical substrate 1 opposite to the surface on which the intermediate layer 2 is provided. These antireflection films 7 and 8 were formed by vacuum evaporation. The antireflection film 7 provided on the optical resin layer 3 has a five-layer structure comprising an SiO$_2$ layer (thickness: 31 nm), a Ti$_2$O$_3$ layer (thickness: 15 nm), an SiO$_2$ layer (thickness: 24 nm), a Ti$_2$O$_3$ layer (thickness: 93 nm), and an SiO$_2$ layer (thickness: 83 nm) laminated in this order on the optical resin layer 3. It is to be noted that the refractive index of the SiO$_2$ layer was 1.46, and the refractive index of the Ti$_2$O$_3$ layer was 2.35.

The antireflection film 8 formed on the optical substrate 1 has a four-layer structure comprising a Ti$_2$O$_3$ layer (thickness: 11 nm), an SiO$_2$ layer (thickness: 24 nm), a Ti$_2$O$_3$ layer (thickness: 117 nm), and an SiO$_2$ layer (thickness: 89 nm) laminated in this order on the optical substrate 1. It is to be noted that the refractive index of the SiO$_2$ layer and the refractive index of the Ti$_2$O$_3$ layer are the same as those described above.

As shown in FIG. 1, the intermediate layer 2 of Example 1 is formed from a matrix resin layer 4 containing silicon oxide particles 5 dispersed therein. The thickness of the intermediate layer 2 is 200 nm. The maximum thickness of the optical resin layer 3 is 140 μm.

EXAMPLE 2

As shown in FIG. 2, a hybrid aspherical lens was produced in the same manner as in the Example 1 except that the intermediate layer 2 was replaced with one comprising a coupling agent layer 6 provided on the optical substrate 1 and a matrix resin layer 4, containing silicon oxide particles 5 dispersed therein, provided on the coupling agent layer 6.

The coupling agent layer 6 was formed by heating the coupling agent solution 3 spin-coated on the optical substrate 1 at 140° C. for 1 hour. The thickness of the coupling agent layer 6 is 10 nm. The matrix resin layer 4 was formed in the same manner as in the Example 1. The maximum thickness of the matrix resin layer 4 is 200 nm.

Therefore, the thickness of the intermediate layer 2 of Example 2 is 210 nm.

EXAMPLE 3

In this example, niobium oxide particles were used as microparticles 5. More specifically, a hybrid aspherical lens was produced in the same manner as in the Example 2 except that the matrix resin layer 4 was replaced with one formed using the niobium oxide particle dispersion liquid containing niobium oxide particles as microparticles 5.

EXAMPLE 4

Niobium oxide particles (average particle size: 10 nm) were added to ethanol to prepare a dispersion liquid containing 10% by weight of the niobium oxide particles. 1 g of the dispersion liquid was added to 1 g of the optical resin layer-forming solution prepared above, and the resulting mixture was stirred to prepare an optical resin layer-forming solution containing niobium oxide particles dispersed therein. A hybrid aspherical lens was produced in the same manner as in the Example 3 except that the optical resin layer 3 was replaced with one formed using the optical resin layer-forming solution prepared in this example.

EXAMPLE 5

As shown in FIG. 4, an intermediate layer 2 comprises a coupling agent layer 6 provided on an optical substrate 1, a matrix resin layer 9 provided on the coupling agent layer 6, and a coupling agent layer 6 provided on the matrix resin layer 9. As shown in FIG. 5, the matrix resin layer 9 has a four-layer structure. Such a matrix resin layer 9 was formed by laminating a matrix resin layer 4a containing silicon oxide particles 5a dispersed therein on a matrix resin layer 4b containing niobium oxide particles 5b dispersed therein to prepare a two-layer structure and then carrying out this process again to prepare a four-layer structure. More specifically, the niobium oxide particle dispersion liquid was spin-coated and heated at 140° C. for 1 hour, and then the silicon oxide particle dispersion liquid was spin-coated thereon and heated at 140° C. for 1 hour. This process was repeated twice to form a matrix resin layer 9 having a four-layer structure shown in FIG. 5.

The coupling agent layer 6 provided on the optical substrate 1 was formed by heating the coupling agent solution 3 spin-coated on the optical substrate 1 at 140° C. for 1 hour. The thickness of this coupling agent layer 6 is 10 nm.

The coupling agent layer 6 provided on the matrix resin layer 9 was formed by heating the coupling agent solution 3 spin-coated on the matrix resin layer 9 at 100° C. for 1 hour. The thickness of this coupling agent layer 6 is 10 nm. The optical resin layer 3 was formed in the same manner as in the Example 1.

The matrix resin layer 9 shown in FIG. 5 comprises the following layers.

Silicon oxide particle dispersion matrix layer (thickness: 169 nm)

Niobium oxide particle dispersion matrix layer (thickness: 157 nm)

Silicon oxide particle dispersion matrix layer (thickness: 93 nm)

Niobium oxide particle dispersion matrix layer (thickness: 79 nm)

These layers are arranged in this order from the optical resin layer side of the matrix resin layer 9, that is, from the upper side of the matrix resin layer 9.

It is to be noted that the refractive index of the silicon oxide particle dispersion matrix layer is 1.48, and the refractive index of the niobium oxide particle dispersion matrix layer is 1.59.

A hybrid aspherical lens having no matrix resin layer 9 was produced by way of comparison to make a comparison of transmittance with the hybrid aspherical lens of Example 5. As a result, the transmittance of the hybrid aspherical lens of Example 5 having a matrix resin layer 9 was about 1.8% higher than that of the hybrid aspherical lens produced by way of comparison.

EXAMPLE 6

An intermediate layer 2 shown in FIG. 6 was formed. A coupling agent layer 6 was formed by heating the coupling agent solution 3 spin-coated on an optical substrate 1 at 140° C. for 1 hour. The thickness of the coupling agent layer 6 is 10 nm.

A matrix resin layer 4 containing silicon oxide particles 5 dispersed therein was formed by heating the silicon oxide particle dispersion liquid spin-coated on the coupling agent layer 6 at 140° C. for 1 hour and irradiating it with ultraviolet rays emitted from a high-pressure mercury lamp. The thus obtained matrix resin layer 4 had a thickness of 0.9 μm. Then, the matrix resin layer 4 was brought into contact with a buffered hydrofluoric acid (BHF) solution to dissolve and remove the silicon oxide particles contained in the surface of the matrix resin layer 4 and its vicinity. In this way, a plurality of pores 4c were formed in the surface of the matrix resin layer 4 so that the matrix resin layer 4 had a porous surface.

Then, an optical resin layer 3 was formed in the same manner as in the Example 1 so that the pores 4c formed in the surface of the matrix resin layer 4 were filled with the resin constituting the optical resin layer 3.

EXAMPLE 7

As shown in FIG. 7, an intermediate layer 2 was formed on the entire surface of an optical substrate 1.

FIG. 8 is a cross-sectional view taken along the A-A line shown in FIG. 7. As shown in FIG. 8, the intermediate layer 2 comprises a coupling agent layer 6 provided on the optical substrate 1 and a matrix resin layer 4, containing niobium oxide particles 5 dispersed therein, provided on the coupling agent layer 6. Such an intermediate layer 2 was formed in the following manner. First, the optical substrate 1 was immersed in the coupling agent solution 3, taken out of the coupling agent solution 3 to blow off excess of the solution using an air blower, and heated at 140° C. for 1 hour. As a result, a coupling agent layer 6 having a thickness of 10 nm was formed on the entire surface of the optical substrate 1.

Next, the optical substrate 1 having the coupling agent layer 6 formed thereon was immersed in the niobium oxide particle dispersion liquid, taken out of the dispersion liquid to blow off excess of the dispersion liquid using an air blower, and heated at 100° C. for 1 hour. As a result, a matrix resin layer 4 having a thickness of 200 nm was formed on the entire surface of the optical substrate 1.

Next, an optical resin layer 3 having a maximum thickness of 140 μm was formed in the same manner as in the Example 1.

EXAMPLE 8

As shown in FIG. 9, a hybrid aspherical lens was produced in the same manner as in the Example 2 except that the antireflection film 7 provided on the optical resin layer 3 was replaced with an antireflection film 13 shown in FIG. 10. The antireflection film 13 was formed by coating the silicon oxide particle dispersion liquid on the surface of an optical resin layer 3. The thus obtained antireflection film 13 had a thickness of 4 μm. Further, the antireflection film 13 was brought into contact with a buffered hydrofluoric acid (BHF) solution in the same manner as in the Example 5 to dissolve and remove silicon oxide particles contained in the surface thereof and its vicinity. In this way, a plurality of pores 4c were formed in the surface of the antireflection film 13 and its vicinity so that the antireflection film 13 had a porous surface.

As shown in FIG. 10, the porous antireflection film 13 has a structure in which the volume of the pores 4c is increased from the optical resin layer side thereof toward the outside thereof. Such a structure continuously changes refractive index and therefore imparts antireflection function to the antireflection film 13.

COMPARATIVE EXAMPLE 1

FIG. 12 shows a hybrid aspherical lens of Comparative Example 1. As shown in FIG. 12, an optical resin layer 3 is provided on an optical substrate 1. FIG. 13 is a cross-sectional view taken along the A-A line shown in FIG. 12. As shown in FIG. 13, a coupling agent layer 11 is provided on the optical substrate 1, and the optical resin layer 3 is provided on the coupling agent layer 11. As the optical substrate 1, the same high refractive index spherical glass lens as used in the Example 1 was used. The coupling agent layer 11 was formed by heating the coupling agent solution 1 spin-coated on the optical substrate 1 at 100° C. for 1 hour. The optical resin layer 3 was formed in the same manner as in the Example 1 so as to have a maximum thickness of 140 µm. Antireflection films 7 and 8 were formed in the same manner as in the Example 1.

The thickness of the coupling agent 11 could not be measured by a stylus profile meter. From the fact, it can be considered that the thickness of the coupling agent layer 11 is 10 nm or less.

COMPARATIVE EXAMPLE 2

As shown in FIG. 14, the thickness of a coupling agent layer 11 of Comparative Example 2 is larger than that of the coupling agent layer 11 of the Comparative Example 1. Such a coupling agent layer 11 was formed by heating the coupling agent solution 3 spin-coated on an optical substrate 1 at 100° C. for 1 hour. The thickness of the thus formed coupling agent layer 11 was measured with a stylus profile meter and was found to be 10 nm.

COMPARATIVE EXAMPLE 3

As shown in FIG. 15, the thickness of a coupling agent layer 11 of Comparative Example 3 is larger than that of the coupling agent layer 11 of the Comparative Example 2. Such a coupling agent layer 11 was formed by heating the coupling agent solution 2 spin-coated on an optical substrate 1 at 100° C. for 1 hour. The thickness of the thus formed coupling agent layer 11 was measured with a stylus profile meter and was found to be 200 nm.

COMPARATIVE EXAMPLE 4

As shown in FIG. 16, a matrix resin layer 12 is provided on a coupling agent layer 11, and the matrix resin layer 12 is composed of an epoxy-based photocurable resin used as a matrix resin and silicon oxide particles 5 dispersed in the matrix resin. That is, a hybrid aspherical lens of Comparative Example 4 was formed in the same manner as in the Example 2 except that the matrix resin was replaced with an epoxy-based photocurable resin.

More specifically, the coupling agent layer 11 was formed by heating the coupling agent solution 3 spin-coated on an optical substrate 1 at 140° C. for 1 hour. The thickness of the thus formed coupling agent layer 11 is 10 nm. Then, a dispersion liquid obtained by dispersing silicon oxide particles in an epoxy-based photocurable resin was spin-coated on the coupling agent layer 11 and was heated at 100° C. for 1 hour to form a matrix resin layer 12 having a thickness of 200 nm.

It is to be noted that the dispersion liquid was prepared using ethanol as a solvent so as to contain silicon oxide particles (average particle size: 20 nm) in an amount of about 5% by weight and an epoxy-based photocurable resin in an amount of about 20% by weight.

(Surface Roughness of Intermediate Layer)

After the intermediate layer of each of the hybrid aspherical lenses of the Examples 1 to 8 and the Comparative Examples 1 to 4 was formed, the surface roughness of the intermediate layer was measured. The measured surface roughness corresponds to the surface roughness of the interface between the intermediate layer and the optical resin layer. The surface roughness of the intermediate layer was measured by AFM (Atomic Force Microscopy). The results of the measurement are shown in Table 1.

(High-Temperature and High-Humidity Test)

The hybrid aspherical lenses of the Examples 1 to 8 and the Comparative Examples 1 to 4 were subjected to a high-temperature and high-humidity test. More specifically, 50 samples were prepared for each Example or comparative Example, and were then left standing under conditions of 85° C. and 85% for 800 hours. After the completion of this test, the number of samples whose optical resin layer was not separated from the substrate was counted. The results of the test are shown in Table 1.

(Measurement of Reflectance)

The reflectance of each of the hybrid aspherical lenses was measured from the optical resin layer side using a lens reflectometer.

The results of the measurement are shown in Table 1.

(Mesh Pattern Projection Test)

The hybrid aspherical lenses of the Examples 1 to 8 and the Comparative Examples 1 to 4 were subjected to a mesh pattern projection test using an apparatus shown in FIG. 17.

More specifically, a lens 17 was placed as a measuring object between a screen 18 having a mesh pattern formed on the surface thereof and a CCD camera 16, and the mesh pattern formed on the screen 18 was magnified and observed by the CCD camera 16. The mesh pattern formed on the screen 18 is a 0.5 mm-pitch mesh pattern 19 shown in FIG. 17.

In a case where a spherical glass lens 10 was used as the lens 17, an image of a distorted mesh pattern shown in FIG. 18(a) was observed due to spherical aberration inherent in spherical lenses. On the other hand, in a case where the hybrid aspherical lens produced above was used as the lens 17, an image of a truly-magnified mesh pattern shown in FIG. 18(b) was observed. In this test, in a case where a mesh pattern shown in FIG. 18(b) was observed, the test result was evaluated as "good", and in a case where partially or slightly distorted grid lines or grid lines of varying thickness were observed, the test result was evaluated as "poor".

The results of the test are shown in Table 1.

TABLE 1

|  | Thickness of Intermediate Layer | Surface Roughness of Intermediate Layer | High-Temperature and High-Humidity Test (Number of Samples) | Reflectance of Resin Surface Side (wavelength: 630 nm) | Mesh Pattern Projection Test |
|---|---|---|---|---|---|
| Ex. 1 | 200 nm | 50 nm or less | 40 | 0.3% or less | Good |
| Ex. 2 | 210 nm | 50 nm or less | 45 | 0.3% or less | Good |
| Ex. 3 | 210 nm | 50 nm or less | 43 | 0.3% or less | Good |
| Ex. 4 | 210 nm | 50 nm or less | 48 | 0.3% or less | Good |
| Ex. 5 | 518 nm | 50 nm or less | 50 | 0.3% or less | Good |

TABLE 1-continued

|  | Thickness of Intermediate Layer | Surface Roughness of Intermediate Layer | High-Temperature and High-Humidity Test (Number of Samples) | Reflectance of Resin Surface Side (wavelength: 630 nm) | Mesh Pattern Projection Test |
|---|---|---|---|---|---|
| Ex. 6 | 1 μm | 50 nm or less | 50 | 0.3% or less | Good |
| Ex. 7 | 210 nm | 50 nm or less | 50 | 0.3% or less | Good |
| Ex. 8 | 210 nm | 50 nm or less | 45 | about 0.7% | Good |
| Comp. Ex. 1 | 10 nm or less | 10 nm or less | 7 | 0.3% or less | Good |
| Comp. Ex. 2 | 10 nm | 10 nm or less | 18 | 0.3% or less | Good |
| Comp. Ex. 3 | 200 nm | 100~150 nm | 40 | 0.3% or less | Poor |
| Comp. Ex. 4 | 210 nm | 50 nm or less | 38 | 0.3% or less | Good |

As can be seen from the results shown in Table 1, the hybrid aspherical lenses of the Examples 1 to 8 according to the present invention had excellent durability even under high temperature and high humidity conditions. On the other hand, the hybrid aspherical lens of the Comparative Example 3 had excellent durability even under high temperature and high humidity conditions, but could not get good result in the mesh pattern projection test because blurring or distortion of the mesh pattern was observed.

In the above Examples 1 to 8, silicon oxide particles or niobium oxide particles were used as microparticles. However, also in a case where zirconium oxide particles were used instead of silicon oxide particles or niobium oxide particles, the same results as described above were obtained.

Further, in the above Examples 1 to 8, a urethane acrylate-based resin was used as an organic polymer constituting the optical resin layer. However, other acrylate-based UV or heat curable resins, such as epoxy acrylate-based resins, polyester acrylate-based resins, and silicone-based urethane acrylate resins, and epoxy-based UV or heat curable resins have the same effect as the urethane acrylate-based resin.

Hereinbelow, the second aspect of the present invention will be described with reference to the following examples.

EXAMPLE 9

FIG. 19 is a cross-sectional view of a laminated optical element of Example 9. As shown in FIG. 19, an intermediate layer 2 is provided on an optical substrate 1, and an optical resin layer 3 is provided on the intermediate layer 2. The intermediate layer 2 comprises a microparticle layer 21 provided on the optical substrate 1 and a coupling layer 22 provided on the microparticle layer 21.

In this example, a high refractive index glass substrate was used as the optical substrate 1. Generally, a high refractive index glass contains a small amount of silica and a large amount of a high refractive index oxide such as $TiO_2$, $ZrO_2$, $Nb_2O_5$, or $Ta_2O_5$. In this example, as such a high refractive index glass, one manufactured by OHARA under the trade name of "S-TIH6" was used, which is free from Pb and As and contains a large amount of $TiO_2$.

The microparticle layer 21 was formed by baking a commercially-available aqueous colloidal silica solution coated on the optical substrate 1 at 400° C. for 2 hours. Generally, an aqueous colloidal silica solution contains 10 to 40% by weight of $SiO_2$ microparticles having an average particle size of 5 nm to 500 nm dispersed in water. In this example, an aqueous colloidal silica solution containing 10% by weight of $SiO_2$ microparticles having an average particle size of 5 nm dispersed in water was used. It is to be noted that the average particle size of the $SiO_2$ microparticles can be measured by an electron microscope.

Such an aqueous colloidal silica solution was diluted with water by mixing them together in a ratio by weight (aqueous colloidal silica solution:water) of 1:8. The diluted aqueous colloidal silica solution was spin-coated at a rotation speed of 3,000 rpm on a high refractive index lens used as the optical substrate 1. Prior to spin-coating of the aqueous colloidal silica solution, the surface of the lens was previously treated with diluted hydrofluoric acid to improve the wettability thereof to the aqueous colloidal silica solution. Instead of hydrofluoric acid treatment, the surface of the glass lens may be immersed in a detergent to adsorb the detergent component thereto. By carrying out such pretreatment, it is possible to more uniformly disperse the microparticles in the microparticle layer. The thickness of the microparticle layer depends on the surface condition of the optical substrate 1 subjected to the pretreatment, but can be controlled by varying the concentration of the aqueous colloidal silica solution as long as the surface condition of the optical substrate 1 subjected to the pretreatment and coating conditions (e.g., spin-coating conditions) are always kept constant. In this example, the thickness of the microparticle layer is 20 nm. From the viewpoint of preventing the occurrence of cracks, the thickness of the microparticle layer is preferably about 1,000 nm or less. It is to be noted that as a solution containing $SiO_2$ microparticles, in addition to such a water-based one as described above, a solvent-based one such as an alcohol-based or toluene-based one is also commercially available. However, a water-based one is preferably used because a greater binding force between microparticles can be obtained when it is coated on the optical substrate 1. When comparisons are made between an alcohol-based one and a toluene-based one, the alcohol-based one is preferably used because a film having a higher strength can be obtained. That is, as a solution for forming a microparticle layer, an alcohol-based solution using, for example, ethanol or isopropyl alcohol is preferably used, and a water-based solution is most preferably used.

As described above, the microparticle layer 21 is formed by baking the aqueous colloidal silica solution coated on the optical substrate 1 at 400° C. for 2 hours. At this time, mutual diffusion of the constituent material of the optical substrate 1 and the constituent material of the microparticle layer 21 occurs at the interface between the optical substrate 1 and the microparticle layer 21, thereby improving the adhesion between the optical substrate 1 and the microparticle layer 21. If the baking temperature exceeds 500° C., deformation of the substrate occurs depending on the kind of glass used. Therefore, the baking temperature is preferably 500° C. or less, more preferably about 400° C.

FIG. 20 is an enlarged cross-sectional view of the microparticle layer 21 and the coupling layer 22 shown in FIG. 19. As shown in FIG. 20, the microparticle layer 21 has a Ti diffusion region 21a formed by diffusion of Ti from the optical substrate 1 and a region 21b containing a high concentration of silica (hereinafter, simply referred to as a "high silica concentration region") formed on the upper side thereof. The analysis of Ti concentration was carried out by STEM-EDS. STEM-EDS is a technique for analyzing atoms contained in a sample and their ratios (i.e., chemical composition) from the strength of X-rays generated by electron beams striking the cross-section of the sample observed by a TEM. As a result of the STEM-EDS analysis, the Ti concentration of the high silica concentration region 21b was about 1 atomic percent and the Ti concentration of the Ti diffusion region 21a was about 9 atomic percent. From the result, it can be considered that the high silica concentration region 21b contains about 99 atomic percent of Si and about 1 atomic percent of Ti and that the Ti diffusion region 21a contains about 91 atomic percent of Si and about 9 atomic percent of Ti. That is, it can be considered that the Ti concentration of the Ti diffusion region 21a is about 9 times higher than that of the high silica concentration region 21b.

After the microparticle layer 21 was formed by baking, the coupling layer 22 was formed using the coupling agent solution 2 prepared above on the microparticle layer 21. More specifically, the coupling agent solution 2 was coated on the surface of the microparticle layer 21 and heated at 100° C. for 5 minutes. Then, excess of the coupling agent was removed using isopropyl alcohol to form a coupling agent layer having a thickness of 1 nm or less on the microparticle layer 21. The thus obtained coupling layer was too thin to be observed with a transmission electron microscope. From the fact, it can be considered that the coupling layer has a thickness of about one to several molecular layers.

As described above, it is preferred that the coupling agent solution coated on the microparticle layer 21 is heated at about 100 to 120° C. and that excess of the coupling agent coated on the microparticle layer 21 is removed with an alcohol such as ethanol or isopropyl alcohol so as to have a thickness of 1 nm or less. This makes it possible to obtain a coupling layer having improved adhesion to the microparticle layer 21.

On the thus obtained coupling layer 22, the optical resin layer 3 was formed using the optical resin layer-forming solution prepared above.

In this example, before the coupling layer 22 was formed by coating the coupling agent solution on the microparticle layer 21, the surface of the microparticle layer 21 was pretreated to be hydrophobic. Such pretreatment can be carried out using, for example, an organic solvent-based solution. In this example, the surface of the microparticle layer 21 was pretreated by immersing it in a photoresist remover containing alkylbenzene and alkylbenzenesulfonic acid as main ingredients ("502A" manufactured by TOKYO OHKA KOGYO, aromatic hydrocarbon: 100% by weight, phenol: 20% by weight, alkylbenzensulfonic acid: 20% by weight). After the completion of the pretreatment, the surface of the microparticle layer 21 was washed with acetone.

In this example, as described above, the coupling layer 22 was formed using the coupling agent solution 2. However, the coupling agent solution 1 or the coupling agent solution 3 may alternatively be used.

(Separation Test)

A laminated optical element was formed by way of comparison in the same manner as in the Example 9 except that the microparticle layer was omitted. More specifically, a laminated optical element as a comparative example was formed by directly forming a coupling layer on a high refractive index glass lens used as an optical substrate without forming a microparticle layer on the optical substrate, and then forming an optical resin layer on the coupling layer.

The laminated optical elements of the Example 9 were prepared as samples according to the present invention. These samples and samples of the comparative example were subjected to an acceleration test by exposing them to an atmosphere whose temperature was 85° C. and humidity was 85% for 500 hours. After the completion of the acceleration test, these samples were visually observed. In the samples of the comparative example, separation of the optical resin layer having a substantially circular shape and a thickness of about several to several tens of micrometers was observed. On the other hand, in the samples of Example 9 according to the present invention, separation of the optical resin layer was not observed at all. Further, even in a case where the high refractive index glass "S-TIH6" was replaced with another high refractive index glass "S-LAH79" (manufactured by OHARA) or with a high refractive index translucent ceramics, the same results were obtained.

EXAMPLE 10

FIG. 21 is a cross-sectional view of a laminated optical element of Example 10. As shown in FIG. 21, an intermediate layer 2 is provided on an optical substrate 1, and an optical resin layer 3 is provided on the intermediate layer 2. The intermediate layer 2 has a laminate structure comprising a microparticle layer and a coupling layer 22. The microparticle layer comprises an $Nb_2O_5$ microparticle layer 23, an $SiO_2$ microparticle layer 24, an $Nb_2O_5$ microparticle layer 25, and an $SiO_2$ microparticle layer 26.

As the optical substrate 1, the same high refractive index glass lens (refractive index: 1.8) as used in the Example 9 was used.

The microparticle layer 23 has a thickness of 20 nm, the microparticle layer 24 has a thickness of 20 nm, the microparticle layer 25 has a thickness of 140 nm and the microparticle layer 26 has a thickness of 80 nm. As in the case of the Example 9, each of the $SiO_2$ microparticle layers 24 and 26 was formed by spin-coating an aqueous colloidal silica solution (average particle size of silica particles: 5 nm, $SiO_2$ content: 10% by weight) diluted with water. The $Nb_2O_5$ microparticle layer 23 was formed by spin-coating a commercially available aqueous $Nb_2O_5$ sol solution (average particle size of $Nb_2O_5$ particles: 5 nm, $Nb_2O_5$ content: 10% by weight) diluted with water 50-fold. The $Nb_2O_5$ microparticle layer 25 was formed by spin-coating the commercially available aqueous $Nb_2O_5$ sol solution diluted with water 1.6-fold. It is to be noted that the microparticle layer 25 was formed by carrying out spin-coating twice because the thickness of a layer obtained by carrying out spin-coating once was about 70 nm. Further, it is to be noted that prior to formation of the microparticle layer 23, pretreatment was carried out using a photoresist remover in the same manner as in the Example 9.

The spin-coated aqueous colloidal silica solution was baked at 140° C. for 1 minute. The spin-coated aqueous $Nb_2O_5$ sol solution was baked at 140° C. for 1 minute. As in the case of the Example 9, after the formation of the microparticle layer 26, baking was carried out at 400° C. for 2 hours to cause mutual diffusion. By causing mutual diffusion, it is possible to improve the adhesion between the multilayer film and the optical substrate 1. Thereafter, in the same manner as in the Example 9, the coupling layer 22 was formed by coating the coupling agent solution on the microparticle layer and the optical resin layer 3 was formed on the coupling layer 22.

FIG. 22 is an enlarged cross-sectional view of the intermediate layer 2 shown in FIG. 21. As shown in FIG. 22, the microparticle layers 23, 24, and 25 contain Ti diffused from the optical substrate 1.

In this example, as described above, the SiO$_2$ microparticle layer is provided on the Nb$_2$O$_5$ microparticle layer, but an additional microparticle layer containing both the Nb$_2$O$_5$ microparticles and the SiO$_2$ microparticles may be provided between these layers to create a graded compositional change. By providing such an additional microparticle layer, it is possible to reduce stress during formation of such a multilayer film.

(Separation Test)

The laminated optical elements of the Example 10 were prepared as samples for a separation test. These samples were subjected to a separation test in the same manner as in the Example 9. As a result, separation of the optical resin layer was not observed at all in these samples. Further, even in a case where the high refractive index glass "S-TIH6" was replaced with another high refractive index glass "S-LAH79" (manufactured by OHARA) or with a high refractive index translucent ceramics, the same results were obtained.

EXAMPLE 11

FIG. 23 is a cross-sectional view of a laminated optical element of Example 11. As shown in FIG. 23, an intermediate layer 2 is provided on an optical substrate 1, and an optical resin layer 3 is provided on the intermediate layer 2. The intermediate layer 2 comprises a first microparticle layer 27, a second microparticle layer 28, and a coupling layer 22. The first microparticle layer 27 was formed using an aqueous colloidal silica solution in the same manner as in the Example 9. More specifically, the first microparticle layer 27 was formed by baking an aqueous colloidal silica solution coated on the optical substrate 1 at 400° C. for 2 hours. The thickness of the first microparticle layer 27 is 5 nm. The second microparticle layer 28 was formed by baking the same aqueous colloidal silica solution coated on the first microparticle layer 27 at a temperature lower than the baking temperature of the first microparticle layer 27, that is, at 280° C. for 30 minutes. The thickness of the second microparticle layer 28 is 5 nm.

FIG. 24 is an enlarged cross-sectional view of the intermediate layer 2 shown in FIG. 23. As shown in FIG. 24, the first microparticle layer 27 contains Ti etc. diffused from the optical substrate 1 because, as described above, the first microparticle layer 27 is baked at 400° C. On the other hand, the second microparticle layer 28 hardly contains Ti etc. because, as described above, the second microparticle layer 28 is baked at 280° C. and therefore diffusion of Ti etc. from the optical substrate 1 into the second microparticle layer 28 hardly occurs. Therefore, the second microparticle layer 28 has a high silica content, thereby improving the adhesion between the second microparticle layer 28 and the coupling layer 22 formed on the second microparticle layer 28.

As described with reference to Example 11, by baking an aqueous colloidal silica solution coated on a microparticle layer at a lower baking temperature, it is possible to provide a layer having a high silica content on the microparticle layer while keeping the total thickness of these layers small. By reducing the thickness of a microparticle layer, it is possible to suppress the occurrence of separation or cracks. According to such a production method, it is possible to produce a laminated optical element having higher reliability.

It is to be noted that the coupling layer 22 and the optical resin layer 3 were formed in the same manner as in the Example 9.

EXAMPLE 12

FIG. 25 is a cross-sectional view of a laminated optical element of Example 12. As shown in FIG. 25, an intermediate layer 2 is provided on an optical substrate 1, and an optical resin layer 3 is provided on the intermediate layer 2. The intermediate layer 2 comprises a microparticle layer 29 and a coupling layer 22 provided on the microparticle layer 29. The microparticle layer 29 was formed using an aqueous colloidal silica solution containing silica microparticles having an average particle size of 80 nm. By using such SiO$_2$ microparticles having an average particle size of 80 nm, it is possible to allow the microparticle layer 29 to have large surface irregularities so that the surface area of the microparticle layer 29 is increased, thereby improving the adhesion between the microparticle layer 29 and the coupling layer 22. In addition, the optical resin layer 3 penetrates into the surface depressions of the coupling layer 22 at the interface between the coupling layer 22 and the optical resin layer 3, thereby improving the adhesion between the coupling layer 22 and the optical resin layer 3.

It is to be noted that the coupling layer 22 and the optical resin layer 3 were formed in the same manner as in the Example 9.

EXAMPLE 13

FIG. 26 is a cross-sectional view of a laminated optical element of Example 13. As shown in FIG. 26, an intermediate layer 2 is provided on an optical substrate 1, and an optical resin layer 3 is provided on the intermediate layer 2. The intermediate layer 2 comprises a first microparticle layer 30, a second microparticle layer 31, and a coupling layer 22.

The first microparticle layer 30 was formed by using an aqueous colloidal silica solution containing silica microparticles having an average particle size of 5 nm. More specifically, the first microparticle layer 30 was formed by baking the aqueous colloidal silica solution coated on the optical substrate 1 at 400° C. for 2 hours. The thickness of the first microparticle layer 30 is about 20 nm. The second microparticle layer 31 was formed using an aqueous colloidal silica solution containing silica microparticles having an average particle size of 80 nm. More specifically, the second microparticle layer 31 was formed by baking the aqueous colloidal silica solution coated on the first microparticle layer 30 at 280° C. for 30 minutes. The thickness of the second microparticle layer 31 is about 300 nm. According to this example, it is possible to produce a laminated optical element in which the first microparticle layer 30 exhibits good adhesion to the optical substrate 1 and the second microparticle layer 31 exhibits good adhesion to the coupling layer 22 and the optical resin layer 3.

Such a first microparticle layer 30 was observed with a TEM and was found to have a very smooth surface. This is because as described above, the first microparticle layer 30 comprises microparticles having an average particle size of 5 nm, and therefore these microparticles are closely packed together in the layer without leaving gaps between the microparticles. This makes it possible to allow the first microparticle layer 30 to come in contact with the optical substrate 1 at the entire interface therebetween so that the first microparticle layer 30 exhibits good adhesion to the optical substrate 1. Such a dense microparticle layer can be formed by using colloidal particles having an average particle size of about 50 nm or less. On the other hand, as described above, the second microparticle layer 31 has large surface irregularities as in the case of the Example 12, and therefore can exhibit good adhesion to the coupling layer 22 and the optical resin layer 3.

The contact area between the first microparticle layer 30 and the second microparticle layer 31 at their interface is small. However, since these microparticle layers are made of the same material, it is possible to sufficiently obtain good adhesion between these microparticle layers simply by, for example, annealing them at a temperature of about 120° C.

In this example, as described above, two microparticle layers are formed to provide a graded structure in which the particle size of the microparticles constituting the microparticle layers is gradually increased. However, three or more microparticle layers may be formed to provide such a graded structure in which the particle size of microparticles is gradually increased.

It is to be noted that the coupling layer 22 and the optical resin layer 3 were formed in the same manner as in the Example 9.

EXAMPLE 14

In each of the Examples described above, an aqueous colloidal silica solution is used for forming a microparticle layer, but a binder resin may be added to the aqueous colloidal silica solution. By using an aqueous colloidal silica solution containing a binder resin, it is possible to form a microparticle layer without baking the aqueous colloidal silica solution at a high temperature of about 300 to 500° C. For example, such an aqueous colloidal silica solution containing a binder resin is cured by heating at about 120° C. or irradiation with ultraviolet rays so that a microparticle layer is formed.

In this example, an aqueous colloidal silica solution containing a binder resin is used.

FIGS. 27(a) to 27(d) are cross-sectional views which show the production steps of a laminated optical element of Example 14. First, as shown in FIG. 27(a), a high refractive index glass lens was prepared as an optical substrate 1. Next, as shown in FIG. 27(b), a first microparticle layer 32a was formed on one of the surfaces of the optical substrate 1. The first microparticle layer 32a was formed using an aqueous colloidal silica solution containing no binder resin (average particle size of silica particles: 5 nm, $SiO_2$ content: 10% by weight). The aqueous colloidal silica solution was coated on the optical substrate 1, and was then baked at 400° C. to cause mutual diffusion between the optical substrate 1 and the first microparticle layer 32a. The first microparticle layer has a thickness of 20 nm. As shown in FIG. 27(b), on the first microparticle layer 32a, a coupling layer 22a and an optical resin layer 3a were formed in the same manner as in the Example 9.

Next, as shown in FIG. 27(c), a second microparticle layer 32b was formed so as to cover the entire surface of the laminated optical element. The second microparticle layer 32b was formed by coating an aqueous solution obtained by adding as a binder resin, 20 μL of 2-hydroxyethyl methacrylate to a mixture of 4 mL of an aqueous colloidal silica solution (average particle size of silica particles: 5 nm, $SiO_2$ content: 10% by weight) and 4 mL of water. It is to be noted that there is a possibility that uneven coating occurs when such an aqueous colloidal silica solution containing a binder resin is coated by spin-coating. Therefore, it is preferred that the aqueous colloidal silica solution is coated while being dried as soon as possible by blowing a nitrogen gas or air on it using an air gun or the like. In this example, the aqueous colloidal silica solution was coated while being dried by blowing air on it. After being dried, the second microparticle layer 32b was irradiated with ultraviolet rays.

The reason why the binder resin is used for forming the second microparticle layer 32b is that high-temperature baking cannot be carried out for the second microparticle layer 32b because the first microparticle layer 32a has already been formed.

Next, as shown in FIG. 27(d), a second coupling layer 22b and a second optical resin layer 3b were formed in the same manner as in the Example 9 on the second microparticle layer 32b formed on the other surface of the optical substrate 1.

In the laminated optical element shown in FIG. 27(d), the second microparticle layer 32b provided on one surface (upper surface) of the optical substrate 1 functions as a hard coat layer, and the second microparticle layer 32b provided on the other surface (lower surface) of the optical substrate 1 functions as a microparticle layer for improving the adhesion between the optical substrate and the optical resin layer.

In this example, as described above, 2-hydroxyethyl methacrylate that is one of water-soluble acrylic monomers is used as a binder resin. However, a water-soluble acrylic resin or a water-soluble epoxy resin may alternatively be used as a binder resin. Further, as described above, the aqueous solution used for forming the second microparticle layer 32b is prepared by adding 20 μL of 2-hydroxyethyl methacrylate to a mixture of 4 mL of the aqueous colloidal silica solution and 4 mL of water. However, by further adding 20 μL of the coupling agent solution 2 to the aqueous solution, it is possible to make the aqueous solution more stable. By using such an aqueous solution, it is possible to reduce the occurrence of uneven coating when the second microparticle layer 32b is formed.

Among various water-soluble acrylic monomers usable as a binder resin, those having a hydroxyl group (e.g., the above-mentioned monomer) are preferably used because they are less likely to cause agglomeration of microparticles and are therefore easy to handle.

Further, in a case where the microparticle layer is formed using $Nb_2O_5$ microparticles, uneven coating is less likely to occur as compared to a case where the microparticle layer is formed using $SiO_2$ microparticles. For example, an $Nb_2O_5$ microparticle layer can be formed by spin-coating an aqueous solution obtained by adding 20 μL of 2-hydroxyethyl methacrylate to a mixture of 4 mL of an aqueous $Nb_2O_5$ sol solution (average particle size of $Nb_2O_5$ particles: 5 nm, $Nb_2O_5$ content: 10% by weight) and 4 mL of water. Furthermore, a multilayered microparticle film can be easily formed by alternately laminating an $SiO_2$ microparticle layer and an $Nb_2O_5$ microparticle layer and then simultaneously irradiating these layers with ultraviolet rays.

EXAMPLE 15

FIGS. 28(a) to 28(d) are cross-sectional views which show the production steps of a laminated optical element of Example 15.

As shown in FIG. 28(a), a high refractive index lens having a flat surface on one side thereof was prepared as an optical substrate 1. Then, as shown in FIG. 28(b), a first microparticle layer 33 was formed by coating an undiluted aqueous $Nb_2O_5$ sol solution (average particle size of $Nb_2O_5$ particles: 5 nm, $Nb_2O_5$ content: 10% by weight) on the flat surface of the optical substrate 1. Then, the first microparticle layer 33 was patterned by either of the following two methods to produce a Fresnel lens.

(First Method)

A microparticle layer formed by coating, on a lens, an aqueous $Nb_2O_5$ sol solution (average particle size of $Nb_2O_5$ particles: 5 nm, $Nb_2O_5$ content: 10% by weight) is cured to some extent by baking it at 140° C. for 30 minutes. Then, a photoresist is formed on the surface of the microparticle layer, and a resist pattern for forming a diffraction grating is formed using a photomask. Thereafter, the lens having the microparticle layer is immersed in a detergent, exclusively for cleaning glass ("SE10" manufactured by Sonic Fellow Co., Ltd.), kept at 80° C. for 5 to 10 minutes. As a result, part of the microparticle layer not covered with the resist film is dissolved in the detergent and removed from the lens. The remaining photoresist is removed by a resist stripper. The microparticle layer can also be removed using hydrofluoric acid, but in this case, there is a fear that the lens used as an optical substrate is also etched, whereas the detergent can selectively remove only the microparticle layer. This method for removing microparticles can be used not only for $Nb_2O_5$ microparticles but also for $SiO_2$ microparticles and other oxide microparticles.

(Second Method)

A microparticle layer formed by coating, on a lens, a mixture of 4 mL of the same aqueous $Nb_2O_5$ sol solution as used in the first method and 20 μL of 2-hydroxyethyl methacrylate is irradiated with ultraviolet rays through a photomask. As a result, only part of the microparticle layer exposed to ultraviolet rays is cured due to the cross-linking reaction of a photosensitive acrylic monomer, that is, 2-hydroxyethyl methacrylate. Then, the lens having the microparticle layer is immersed in a detergent, exclusively for cleaning glass ("SE10"), kept at 80° C. for 5 to 10 minutes. As a result, part of the microparticle layer not exposed to ultraviolet rays is dissolved in the detergent and removed from the lens.

After the first $Nb_2O_5$ microparticle layer 33 was patterned by either of the above two methods, as shown in FIG. 28(c), a second $SiO_2$ microparticle layer 34 was formed on the first microparticle layer 33. In a case where the first microparticle layer 33 contains a binder resin, it is preferred that the second microparticle layer 34 also contains a binder resin. On the other hand, in a case where the first microparticle layer 33 is patterned without adding a binder resin thereto, it is preferred that the second microparticle layer 34 also contains no binder resin. In this case, the second microparticle layer is cured by baking it at 400° C. for 2 hours.

Next, the coupling agent solution 2 was coated on the second microparticle layer 34, and a surficial part thereof was removed by an alcohol in the same manner as in the Example 9 to form a coupling layer 22 having a thickness of 1 nm or less.

Next, as shown in FIG. 28(d), an optical resin layer 3 was formed on the coupling layer 22 in the same manner as in the Example 9. In this way, a Fresnel lens was obtained.

EXAMPLE 16

FIG. 29 is a cross-sectional view of a laminated optical element of Example 16. In this example, a plate-like optical substrate 1 was used. As shown in FIG. 29, on one surface of the optical substrate 1, a Fresnel lens using a diffraction grating and an aspherical lens formed from an optical resin layer 3a are provided, and on the other surface of the optical substrate 1, a Fresnel lens using a diffraction grating and an aspherical lens formed from an optical resin layer 3b are provided. More specifically, on the upper surface of the optical substrate 1, a patterned first microparticle layer 35a, a second microparticle layer 36a, a coupling layer 22a, and an optical resin layer 3a formed in the same manner as in the Example 15 are provided, and on the lower surface of the optical substrate 1, a patterned first microparticle layer 35b, a second microparticle layer 36b, a coupling layer 22b, and an optical resin layer 3b formed in the same manner as in the Example 15 are provided.

In a case where a plate-like optical substrate is used, as shown in FIG. 30, a plurality of optical elements 37 can be formed simultaneously on one optical substrate.

In a case where a microparticle layer is formed as an outermost hard coat layer as shown in FIG. 27, this hard coat layer may be patterned to form a diffraction grating.

In each of the Examples described above, Ti contained in the optical substrate is diffused into the microparticle layer due to mutual diffusion treatment, thereby improving the adhesion between the microparticle layer and the optical substrate. However, Nb, Zr, Sn, Ce, Ta, or the like also has the same effect as Ti.

Further, in each of the Examples descried above, a spin-coating method is mainly used for forming a microparticle layer, but a dipping method may alternatively be used. In this case, an optical substrate dipped in a coating solution is preferably drawn up from the solution at a constant speed to achieve even coating.

Furthermore, in each of the Examples described above, $SiO_2$ microparticles and/or $Nb_2O_5$ microparticles are used as microparticles, but microparticles usable in the present invention are not limited thereto. For example, other oxide microparticles such as $ZrO_2$, $TiO_2$, $Al_2O_3$, $SnO_2$, $CeO_2$, and $Ta_2O_5$ microparticles, nitride microparticles having a refractive index higher than that of oxide, such as GaN, AlN, and GaInN microparticles, and diamond microparticles may alternatively be used. Since these microparticles have high physical hardness, they are preferably used for forming a microparticle layer also serving as a hard coat layer. In a case where oxide microparticles such as $TiO_2$ or $Nb_2O_5$ microparticles are used for forming a microparticle layer, there is a possibility that part of an optical resin layer being in contact with the microparticle layer is discolored due to photocatalytic reaction caused by irradiation with ultraviolet rays. However, such a problem can be solved by using nitride microparticles.

EXAMPLE 17

FIG. 31 is a cross-sectional view of one example of a camera module according to the present invention. As shown in FIG. 31, a camera module 40 comprises an image pickup device 45, a lens combination of four aspherical lenses 41, 42, 43, and 44 provided on the image pickup device 45, and a holder 46 for holding these four lenses 41 to 44. Such a camera module 40 can be used as a 2- to 5-megapixel camera module for mobile phones.

Each of the aspherical lenses 41 to 44 used in this example has a microparticle layer 21 formed on an optical substrate thereof in the same manner as in the Example 9 and a coupling layer 22 formed on the microparticle layer 21 in the same manner as in the Example 9. Therefore, even in a case where the optical substrate of each of the aspherical lenses 41 to 44 has a low silica content, an optical resin layer 3 having good adhesion to the optical substrate can be reliably formed on the coupling layer 22. This means that a high refractive index glass having a low silica content can be used as an optical substrate of each of the aspherical lenses 41 to 44. Therefore, in this example, an aspherical lens formed in the same manner as in the Example 9 using, as an optical substrate, a high refractive index glass ("S-LAH79" manufactured by OHARA and having a refractive index of about 2.0) is used as each of the aspherical lenses 41 to 44. As described above, since each of the aspherical lenses 41 to 44 uses a high refractive index optical substrate having a refractive index of about 2.0, the lens combination can have a short focal length.

This makes it possible to reduce the length of the holder 46 so that the height of the camera module of this example becomes about 8 mm.

In this example, the aspherical lenses 41 to 44 are all hybrid aspherical lenses, but not all the aspherical lenses 41 to 44 need to be hybrid aspherical lenses. The number of hybrid aspherical lenses may vary depending on the design of the camera module as long as at least one of the aspherical lenses 41 to 44 is a hybrid aspherical lens.

In the case of a conventional camera module for mobile phones using hybrid aspherical lenses not having, on an optical substrate thereof, such a microparticle layer 21 as described in the Example 9, it is necessary for the optical substrate to have a high silica content to allow an optical resin layer to have good adhesion to the optical substrate. Therefore, the variety of glass materials that can be used for the optical substrate is limited, and the upper limit of the refractive index thereof is about 1.6. This makes it impossible to shorten the focal length of a lens combination of the conventional camera module, and therefore the conventional camera module needs to have a height of about 10 mm.

FIGS. 32(a) and 32(b) are cross-sectional views of flip mobile phones each equipped with a conventional camera module having a height of 10 mm.

As shown in FIGS. 32(a) and 32(b), each of the flip mobile phones has a height "H" of 25 mm when folded. The flip mobile phone shown in FIG. 32(a) has an upper part and a lower part, and they have a height "$h_1$" of 12.5 mm and a height "$h_2$" of 12.5 mm, respectively. That is, the upper part is as high as the lower part. The upper part has a camera module 40, a TV tuner 51, a hard disk drive 52, and a display 53 therein. As described above, since the upper part of the mobile phone shown in FIG. 32(a) has a low height "$h_1$" of 12.5 mm, installation of the camera module 40 reduces the size of the display 53. The lower part has a key board 54 and a battery 55 therein.

On the other hand, the flip mobile phone shown in FIG. 32(b) has an upper part with a height "$h_1$" of 14.5 mm, and a lower part with a height "$h_2$" of 10.5 mm. That is, the upper part is higher than the lower part, which makes it possible for the mobile phone to have a large display 53. However, since the height "$h_2$" of the lower part is 10.5 mm, the volume of a battery 55 is reduced, which causes another problem that the capacity of the battery 55 is small.

FIGS. 33(a) and 33(b) are cross-sectional views of examples of a mobile phone according to the present invention. As shown in FIGS. 33(a) and 33(b), each of the mobile phones has at least one camera module 40 according to the present invention therein. As described above, since the height of the camera module 40 according to the present invention can be reduced to, for example, about 8 mm, there is no necessity to increase the height "$h_1$" of an upper part of the mobile phone shown in FIG. 33(a) even when a large display 53 is provided therein. Further, the height "$h_2$" of a lower part of the mobile phone shown in FIG. 33(a) can be made 12.5 mm, that is, the lower part can be made as high as the upper part, and therefore the lower part can have a large capacity battery 55 therein.

As shown in FIG. 33(b), the camera module 40 according to the present invention may be provided in each of the upper and lower parts of a mobile phone. This makes it possible to take a stereoscopic image and to take a high-quality image of a user's own face. Application examples utilizing two or more such camera modules include taking of panoramic images and substantial improvement in sensitivity by electrically synthesizing output signals from camera modules.

EXAMPLE 18

The camera module shown in FIG. 31 can also be used as a camera module for a vehicle-installed back monitor. A vehicle-installed camera module needs to have a high heat resistance, and therefore can use such aspherical lenses as used in the Example 17. Since these aspherical lenses are high refractive index lenses, the camera module can have a wide viewing angle.

EXAMPLE 19

FIG. 34 is a schematic cross-sectional view of a liquid crystal projector. On a light source 63, there is provided an illumination optical system 62 comprising a lens 62a and a lens 62b. Light emitted from the light source 63 impinges on a half mirror 64 and passes through or is reflected off the half mirror 64. Light that has passed through the half mirror 64 is reflected off a mirror 68, passes through a lens 70 and a liquid crystal panel 73, and enters a cross prism 69.

On the other hand, light that has been reflected off the half mirror 64 impinges on a half mirror 65 and passes through or is reflected off the half mirror 65. Light that has been reflected off the half mirror 65 passes through a lens 71 and a liquid crystal panel 74, and enters the cross prism 69. On the other hand, light that has passed through the half mirror 65 is reflected off a mirror 66 and a mirror 67, passes through a lens 72 and a liquid crystal panel 75, and enters the cross prism 69.

The liquid crystal panels 75, 74 and 73 are liquid crystal panels for red (R), green (G), and blue (B), respectively. Light that has passed through the liquid crystal panel 73, light that has passed through the liquid crystal panel 74, and light that has passed through the liquid crystal panel 75 are synthesized by the cross prism 69, and synthesized light passes through a projection optical system 61 and comes out of the projector. The projection optical system 61 comprises hybrid aspherical lenses 61a, 61b, and 61c.

Examples of the light source 63 include a metal halide lamp, a mercury lamp, and LED.

Since the light source 63 generates heat, a conventional liquid crystal projector using lenses 61a to 61c not having such a microparticle layer 21 as described in the Example 9 involves a problem that the separation between an optical resin layer and an optical substrate occurs in the lenses due to temperature change caused by repetition of the ON/OFF operations of the light source 63. In order to solve such a problem, it is necessary to keep a certain distance between the projection optical system 61 comprising these lenses 61a to 61c and the light source 63.

However, the liquid crystal projector of Example 19 uses the same hybrid aspherical lenses as used in the Example 17 as the lenses 61a to 61c, that is, each of the lenses 61a to 61c has a microparticle layer 21 formed on an optical substrate thereof in the same manner as in the Example 9 and a coupling layer 22 formed on the microparticle layer 21 in the same manner as in the Example 9. Therefore, irrespective of the silica content of the optical substrate of each of the lenses 61a to 61c, an optical resin layer 3 having good adhesion to the optical substrate can be reliably formed on the coupling layer 22, so that separation between the optical resin layer and the optical substrate does not occur even when temperature change is caused by repetition of the ON/OFF operations of the light source 63. Further, as described above, since the optical resin layer (resin lens layer) of the hybrid aspherical lens is formed of a high heat resistant organometallic polymer material composed of the organometallic polymer and the organic polymer, the lenses 61a to 61c have excellent heat resistance. Therefore, the lenses 61a to 61c can be arranged near the light source 63.

FIG. 35 is a schematic cross-sectional view of one example of a liquid crystal projector according to the present invention.

A liquid crystal projector 60 shown in FIG. 35 uses the same lenses as used in the Example 17 as lenses 61a to 61c constituting a projection optical system 61. Therefore, as shown in FIG. 35, a light source 63 can be arranged near the projection optical system 61, thereby reducing the size of the liquid crystal projector 60.

As shown in FIG. 35, light emitted from the light source 63 passes through an illumination optical system 62, impinges on a half mirror 64, and passes through or is reflected off the half mirror 64. Light that has been reflected off the half mirror 64 passes through a lens 70 and a liquid crystal panel 73, and then enters a cross prism 69. On the other hand, light that has passed through the half mirror 64 is reflected off a mirror 68, impinges on a half mirror 65, and passes through or is reflected off the half mirror 65. Light that has been reflected off the half mirror 65 passes through a lens 71 and a liquid crystal panel 74, and then enters the cross prism 69. On the other hand, light that has passed through the half mirror 65 is reflected off a mirror 66 and a mirror 67, passes through a lens 72 and a liquid crystal panel 75, and then enters the cross prism 69. Light that has passed through the liquid crystal panel 73, light that has passed through the liquid crystal panel 74, and light that has passed through the liquid crystal panel 75 are synthesized by the cross prism 69, and synthesized light passes through the projection optical system 61 and then comes out of the projector 60.

Both of the liquid crystal projectors shown in FIG. 34 and FIG. 35 are three panel type transmission liquid crystal projectors using three separate liquid crystal panels for red (R), green (G), and blue (B), respectively. However, a single panel type transmission liquid crystal projector using a single liquid crystal panel synthesizing red (R), green (G), and blue (B) can also obtain the same effect as the three panel type transmission liquid crystal projector.

A liquid crystal projector shown in FIG. 36 uses a white LED as a light source 63 for further size reduction. As shown in FIG. 36, the light source 63, an illumination optical system 62, a lens 70, a liquid crystal panel 73, and a projection optical system 61 are arranged linearly, and light emitted from the light source 63 passes through the illumination optical system 62, the lens 70, the liquid crystal panel 73, and the projection optical system 61 and then comes out of the projector. By using the same hybrid aspherical lenses as used in the Example 17 as lenses 61b to 61c constituting the projection optical system 61, it is possible to shorten the focal length of the lens combination, thereby reducing the total length of the liquid crystal projector.

EXAMPLE 20

FIG. 37 is a cross-sectional view of a light waveguide according to the present invention. As shown in FIG. 37, an intermediate layer 81 is provided on a substrate 80, and an optical resin layer 84 is provided on the intermediate layer 81. The optical resin layer 84 comprises a lower clad layer 86, a core layer 85 provided in a groove 86a of the lower clad layer 86, and an upper clad layer 87, and provides a light waveguide. The intermediate layer 81 comprises a microparticle layer 82 and a coupling layer 83.

Examples of the substrate 80 include a glass substrate, an Si substrate, a sapphire substrate, and a GaN substrate and those having an $Al_2O_3$ film, an SiN film, or a metal film formed on the surface thereof. According to the present invention, by forming a microparticle layer substantially composed of $SiO_2$ on the substrate, it is possible to improve the adhesion between the substrate and the coupling layer even when the surface of the substrate does not contain $SiO_2$, thereby improving the adhesion between the optical substrate and the optical resin layer formed on the coupling layer.

The microparticle layer 82 can be formed in the same manner as in the Example 9 by using, for example, an aqueous colloidal silica solution. The coupling layer 83 can also be formed in the same manner as in the Example 9.

On the thus formed coupling layer 83, the optical resin layer 84 comprising the lower clad layer 86, the core layer 85, and the upper clad layer 87 is formed to provide a light waveguide. The lower clad layer 86 and the upper clad layer 87 can be formed using the "optical resin layer-forming solution" prepared in the Example 1. The core layer 85 can also be formed using the "optical resin layer-forming solution" prepared in the Example 1. However, the refractive index of the core layer 85 needs to be about 0.005 higher than that of the clad layer, and therefore the amount of DPhDMS used for preparing the "optical resin layer-forming solution" is increased by 0.1 mL as compared to the case of the optical resin layer-forming solution for the clad layer, that is, 4.2 mL of DPhDMS is added. Hereinafter, the solution prepared for forming the core layer is simply referred to as a "core layer-forming solution".

The lower clad layer 86 is formed by dropping the optical resin layer-forming solution on the coupling layer 83, pressing a die having a projecting portion against the solution layer, and curing the solution layer in this state by irradiation with ultraviolet rays. In this way, the lower clad layer 86 having a groove 86a is formed. Next, the core layer-forming solution is dropped into the groove 86a, and the solution filled in the groove 86a is cured by irradiation with ultraviolet rays. In this way, the core layer 85 is formed.

Next, the optical resin layer-forming solution is dropped onto the lower clad layer 86 and the core layer 85, and is then cured by irradiation with ultraviolet rays. In this way, the upper clad layer 87 is formed.

According to the present invention, since the microparticle layer composed of, for example, $SiO_2$ is formed on the substrate by spin-coating or dipping and the coupling layer is formed by coating a coupling agent on the microparticle layer, the optical resin layer serving as a light waveguide or the like can have good adhesion to the substrate. Therefore, even when the substrate does not contain $SiO_2$ in the surface thereof, the light waveguide or the like can have good adhesion to the substrate. That is, even when the substrate is an Si substrate, the light waveguide can have good adhesion to the substrate. This means that it is possible to form an optical device on an electronic device, that is, it is possible to easily form a large electron-optical device. For example, an electronic device part such as a transmitter and receiver module and a light waveguide part can be formed monolithically.

EXAMPLE 21

A hybrid aspherical lens of Example 21 was formed by laminating on a glass substrate, a mixed microparticle layer, an $SiO_2$ microparticle layer, a coupling layer, and an optical resin layer in this order. In a case where a hybrid aspherical lens or the like uses a glass substrate having a high refractive index, there is a problem that reflection at the interface between the glass substrate and an optical resin layer increases due to a large refractive index difference between the glass substrate and the optical resin layer. Generally, in the case of a hybrid aspherical lens, a refractive index difference between a glass substrate and an optical resin layer needs to be 1% or less, when expressed as an average reflectance of light having a wavelength in the range of 430 to 650 nm. Therefore, a conventional aspherical lens usually has a multilayer antireflection film comprising three or more layers using, for example, two kinds of oxide films having different refractive indexes in combination. Formation of such a multilayer film requires two or more coating operations and strict control of the thickness of each layer. Therefore, in view of the evenness of a film thickness and variations in reproducibility, it is difficult to reduce the average reflectance of light having a wavelength in the range of 430 to 650 nm to 1% or less. However, according to this example, an antireflection film can be easily formed by laminating two oxide layers together, and the use of such an antireflection film makes it possible to reduce the average reflectance of light having a wavelength in the range of 430 to 650 nm to 1% or less.

The laminated optical element of this example has the same structure as shown in FIG. 23 and has an intermediate layer 2 comprising a first microparticle layer 27, a second microparticle layer 28, and a coupling layer 22. In this example, the first microparticle layer 27 is formed from a mixed microparticle layer comprising two kinds of microparticles having different refractive indexes, and the second microparticle layer 28 is formed from an $SiO_2$ microparticle layer.

The refractive index of the mixed microparticle layer is adjusted to a predetermined value by mixing dispersion liquids of two kinds of microparticles having different refractive indexes. The mixed microparticle layer can be formed by spin-coating or dipping. The refractive index of the mixed microparticle layer is preferably an average $n_{ave}$ of the refractive index of the glass substrate and the refractive index of the optical resin layer. Further, the thickness of the mixed microparticle layer is preferably ¼ of a wavelength. In a case where the laminated optical element is used as an optical lens in the visible light region, a center wavelength λ is preferably set to about 540 nm. Therefore, the thickness of the mixed microparticle layer is preferably $(¼)·λ/n_{ave}$.

The $SiO_2$ microparticle layer is formed as a base layer of the coupling layer in order to improve the adhesion between the optical substrate and the optical resin layer. The $SiO_2$ microparticle layer preferably has a small thickness of about 10 to 15 nm to prevent adverse effect on reflectance. Further, in a case where there is no necessity to consider adhesiveness of the optical resin layer to the optical substrate, the $SiO_2$ microparticle layer may be omitted.

The coupling layer also preferably has a small thickness of about 10 to 15 nm to prevent adverse effect on reflectance. Further, in a case where there is no necessity to consider adhesiveness of the optical resin layer to the optical substrate, the coupling layer may be omitted.

In this example, the glass substrate was formed of a high refractive index glass ("S-LAL7" manufactured by OHARA, refractive index: about 1.8). The optical resin layer was formed using the "optical resin layer-forming solution" prepared in the Example 1. The refractive index of the optical resin layer is 1.5.

The mixed microparticle layer was formed using a mixture of an $SiO_2$ microparticle dispersion liquid and an $Nb_2O_5$ microparticle dispersion liquid. As the $SiO_2$ microparticle dispersion liquid, an aqueous colloidal silica solution ("SNOWTEX NXS" manufactured by Nissan Chemical Industry, average particle size: 5 nm, $SiO_2$ content: about 15.7% by weight) was used. As the $Nb_2O_5$ microparticle dispersion liquid, an aqueous niobium sol solution ("Bairal Nb-X10" manufacture by TAKI CHEMICAL, average particle size: 5 nm, $Nb_2O_5$ content: 10% by weight) was used.

Table 2 shows the refractive indexes of microparticle layers formed using a colloidal silica only (sample A), a niobium sol only (sample C), a mixture of the colloidal silica sol and the niobium sol (sample B), respectively. The sample B was prepared by mixing the sample A and the sample C in a weight ratio (sample A:sample C) of 1:2. Each of the microparticle layers was formed by coating the sol on a glass substrate by spin-coating (3,000 rpm, 30 seconds) and drying it.

TABLE 2

| Sample | Ratio between Microparticle Dispersion Liquids | | Oxide Content in Dispersion Liquid | | Ratio between $SiO_2$ and $Nb_2O_5$ in Microparticle Layer | | Refractive Index |
| --- | --- | --- | --- | --- | --- | --- | --- |
| | $SiO_2$ Microparticle Dispersion Liquid (wt %) | $Nb_2O_5$ Microparticle Dispersion Liquid (wt %) | $SiO_2$ (wt %) | $Nb_2O_5$ (wt %) | $SiO_2$ (wt %) | $Nb_2O_5$ (wt %) | |
| A | 100 | 0 | 14.7 | 0.0 | 100 | 0 | 1.38 |
| B | 33 | 67 | 4.9 | 6.7 | 42.4 | 57.6 | 1.65 |
| C | 0 | 100 | 0.0 | 10.0 | 0 | 100 | 1.88 |

FIG. 38 is a graph which shows the relationship between the $Nb_2O_5$ content in the microparticle layer and the refractive index of the microparticle layer. As shown in FIG. 38, the refractive index of the microparticle layer is increased in proportion to the $Nb_2O_5$ content in the microparticle layer. From the fact, it has been found that the refractive index of the microparticle layer can be controlled within the range of 1.39 to 1.88 by changing the $Nb_2O_5$ content in the microparticle layer.

In this example, the Sample B was used to form a mixed microparticle layer having a refractive index of 1.66. The thickness of the microparticle layer was set to 81 nm, which was calculated by setting a center wavelength to 540 nm and using the formula $(¼)·λ/n_{ave}$.

FIG. 39 is a graph which shows calculated values of a reflectance when the refractive index of the optical resin layer is set to 1.5, the refractive index of the mixed microparticle layer is set to 1.66, and the refractive index of the glass substrate is set to 1.8 and changed within the range of 1.7 to 1.9. As shown in FIG. 39, a reflectance is minimized when the refractive index of the glass substrate is 1.8. From the fact, it has been found that a reflectance is minimized when the refractive index of the mixed microparticle layer is set to an average of the refractive index of the glass substrate and the refractive index of the optical resin layer.

According to this example, it is possible to easily provide an antireflection film by forming a mixed microparticle layer. As described above, the refractive index of the microparticle layer can be adjusted to any desired value. Therefore, even when the materials of the glass substrate and the optical resin layer are changed, the refractive index of the mixed microparticle layer can be controlled by changing the kinds of microparticles used and a mixing ratio thereof so that a minimum reflectance can be obtained. More specifically, the refractive index of the mixed microparticle layer is controlled so as to be a mean value of the refractive index of the glass substrate and the refractive index of the optical resin layer.

Further, by providing the $SiO_2$ microparticle layer on the mixed microparticle layer, it is possible to improve the adhesion of the coupling layer to the optical substrate, thereby improving the adhesion of the optical resin layer to the optical substrate.

The invention claimed is:

1. A laminated optical element comprising:
an optical substrate made of an optical material;
an intermediate layer provided on the optical substrate; and
an optical resin layer provided on the intermediate layer,
wherein the optical resin layer is made of a resin composed of an organometallic polymer having an -M-O-M- bond (M is a metal atom), a metal alkoxide and/or a hydrolysate thereof having only one hydrolyzable group, and an organic polymer having a urethane bond and a methacryloxy group or an acryloxy group, and wherein the intermediate layer has a microparticle layer obtained by dispersing metal oxide microparticles in a matrix resin composed of a metal alkoxide and/or a hydrolysate thereof having a radical polymerizable group and a hydrolyzable group; and,
wherein the intermediate layer has a laminate structure comprising at least two layers, at least one of which is the microparticle layer.

2. The laminated optical element according to claim 1, wherein the intermediate layer has the microparticle layer provided on the optical substrate side thereof and a coupling layer provided on the optical resin layer side thereof, the coupling layer being composed of a metal alkoxide and/or a hydrolysate thereof having a radical polymerizable group and a hydrolyzable group.

3. The laminated optical element according to claim 2, wherein the microparticle layer is formed by laminating together a first microparticle layer which is composed of microparticles having an average particle size of less than 50 nm and which is provided on the optical substrate side thereof and a second microparticle layer which is composed of microparticles having an average particle size of 50 nm or more and which is provided on the coupling layer side thereof.

4. The laminated optical element according to claim 2, wherein the coupling layer is formed to have a thickness of 1 nm or less.

5. The laminated optical element according to claim 1, wherein the microparticle layer contains an optical substrate component diffused from the optical substrate.

6. The laminated optical element according to claim 1, wherein the microparticle layer is composed of microparticles having an average particle size of 50 nm or more and has surface irregularities formed by these microparticles.

7. The laminated optical element according to claim 1, wherein the microparticle layer is formed using a dispersion liquid of the microparticles which contains at least one binder resin selected from a water-soluble acrylic monomer, a water-soluble resin, a silane coupling agent, and a photosensitive resin.

8. The laminated optical element according to claim 1, wherein the microparticle layer is patterned to allow the microparticle layer to have an optical function.

9. The laminated optical element according to claim 1, further comprising an antireflection film provided on the outer surface of the optical resin layer.

10. The laminated optical element according to claim 9, wherein the antireflection film is composed of the same material as the intermediate layer and has surface irregularities.

11. The laminated optical element according to claim 1, wherein the optical resin layer also contains the microparticles.

12. The laminated optical element according to claim 1, wherein the refractive index of the intermediate layer is equal to or more than that of the optical resin layer and equal to or less than that of the optical substrate.

13. The laminated optical element according to claim 1, wherein the microparticles are composed of at least one selected from silicon oxide, niobium oxide, and zirconium oxide.

14. The laminated optical element according to claim 1, wherein the intermediate layer has surface irregularities so that the interface between the intermediate layer and the optical resin layer has irregularities.

15. The laminated optical element according to claim 1, wherein the intermediate layer is provided to cover the entire surface of the optical substrate.

16. The laminated optical element according to claim 1, further comprising an antireflection film provided on the optical substrate surface opposite to the surface on which the intermediate layer is provided.

17. The laminated optical element according to claim 1, wherein the optical resin layer further contains an organic acid anhydride and/or an organic acid.

18. The laminated optical element according to claim 1, wherein the optical substrate is a lens made of glass or plastic, and wherein the outer surface of the optical resin layer has an aspherical shape.

19. A camera module comprising:
a lens combination of two or more lenses;
an image pickup device; and
a holder for holding the lens combination and the image pickup device, wherein at least one of the two or more lenses is the laminated optical element according to claim 18.

* * * * *